US010360579B2

(12) United States Patent
Znerold et al.

(10) Patent No.: US 10,360,579 B2
(45) Date of Patent: Jul. 23, 2019

(54) CAMPAIGN PERFORMANCE DATA SNAPSHOT CARDS

(71) Applicant: Adobe Inc., San Jose, CA (US)

(72) Inventors: Christopher Znerold, Boulder, CO (US); Paul Marcus A. Dennert, Milwaukee, WI (US); Daniel Walsh, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 101 days.

(21) Appl. No.: 13/784,425

(22) Filed: Mar. 4, 2013

(65) Prior Publication Data

US 2014/0249911 A1 Sep. 4, 2014

(51) Int. Cl.
*G06Q 30/02* (2012.01)

(52) U.S. Cl.
CPC ................. *G06Q 30/0242* (2013.01)

(58) Field of Classification Search
CPC combination set(s) only.
See application file for complete search history.

(56) References Cited

U.S. PATENT DOCUMENTS

| 6,614,451 B1 | 9/2003 | Hudson et al. |
| 6,681,247 B1 | 1/2004 | Payton |
| 7,107,268 B1 | 9/2006 | Zawadzki |
| 10,269,033 B2 | 4/2019 | Znerold et al. |
| 2002/0072951 A1* | 6/2002 | Lee ............... G06Q 10/063 705/7.32 |
| 2003/0144868 A1* | 7/2003 | MacIntyre ........ G06F 17/30536 705/7.38 |

(Continued)

FOREIGN PATENT DOCUMENTS

WO 2010017424 2/2010

OTHER PUBLICATIONS

Scharl et al., "From Web Intelligence to Knowledge Co-Creation—A Platform for Analyzing and Supporting Stakeholder Communication" (published in IEEE Internet Computing on Sep. 1, 2013) (Year: 2013).*

(Continued)

*Primary Examiner* — James M Detweiler
*Assistant Examiner* — Patrick Kim
(74) *Attorney, Agent, or Firm* — Finch & Maloney PLLC

(57) ABSTRACT

Systems and methods are disclosed for facilitating collaboration amongst individuals working on a coordinated campaign toward certain goals. In furtherance of these goals, the individual team members use technical resources provided by specialized tools, which are also sometimes referred to as applications or products. As the campaign progresses, these applications generate a large volume of data, some of which may be useful to teams other than those which were originally responsible for producing the data. In certain embodiments a campaign manager platform is used to facilitate data sharing and collaboration amongst the various teams that comprise a campaign. In such embodiments the individual team members interact not only with the applications specifically adapted for their team, but also with the campaign manager, which provides a medium for exchanging data and ideas with other teams. This advantageously facilitates data sharing and collaboration amongst the teams, thereby enhancing the overall campaign success.

19 Claims, 19 Drawing Sheets

(56) References Cited

U.S. PATENT DOCUMENTS

| | | | |
|---|---|---|---|
| 2004/0254860 A1* | 12/2004 | Wagner | G06Q 10/06311 705/26.1 |
| 2008/0040674 A1 | 2/2008 | Gupta | |
| 2008/0195429 A1 | 8/2008 | Hoff | |
| 2008/0270164 A1 | 10/2008 | Kidder | |
| 2008/0270223 A1* | 10/2008 | Collins et al. | 705/10 |
| 2008/0313011 A1* | 12/2008 | Rose | G06Q 30/02 705/7.32 |
| 2009/0088875 A1 | 4/2009 | Baier et al. | |
| 2009/0119173 A1* | 5/2009 | Parsons | G06Q 10/107 705/319 |
| 2010/0299763 A1* | 11/2010 | Marcus et al. | 726/30 |
| 2011/0213670 A1* | 9/2011 | Strutton | G06Q 30/02 705/14.73 |
| 2011/0313805 A1 | 12/2011 | Heydemann et al. | |
| 2012/0036008 A1* | 2/2012 | Robertson | G06Q 30/02 705/14.43 |
| 2012/0054778 A1 | 3/2012 | Russell et al. | |
| 2012/0102050 A1 | 4/2012 | Button et al. | |
| 2014/0180788 A1* | 6/2014 | George | G06Q 30/0269 705/14.41 |

OTHER PUBLICATIONS

Notice of Allowance received in U.S. Appl. No. 13/784,428 (19 pages) (dated Apr. 4, 2019).

* cited by examiner

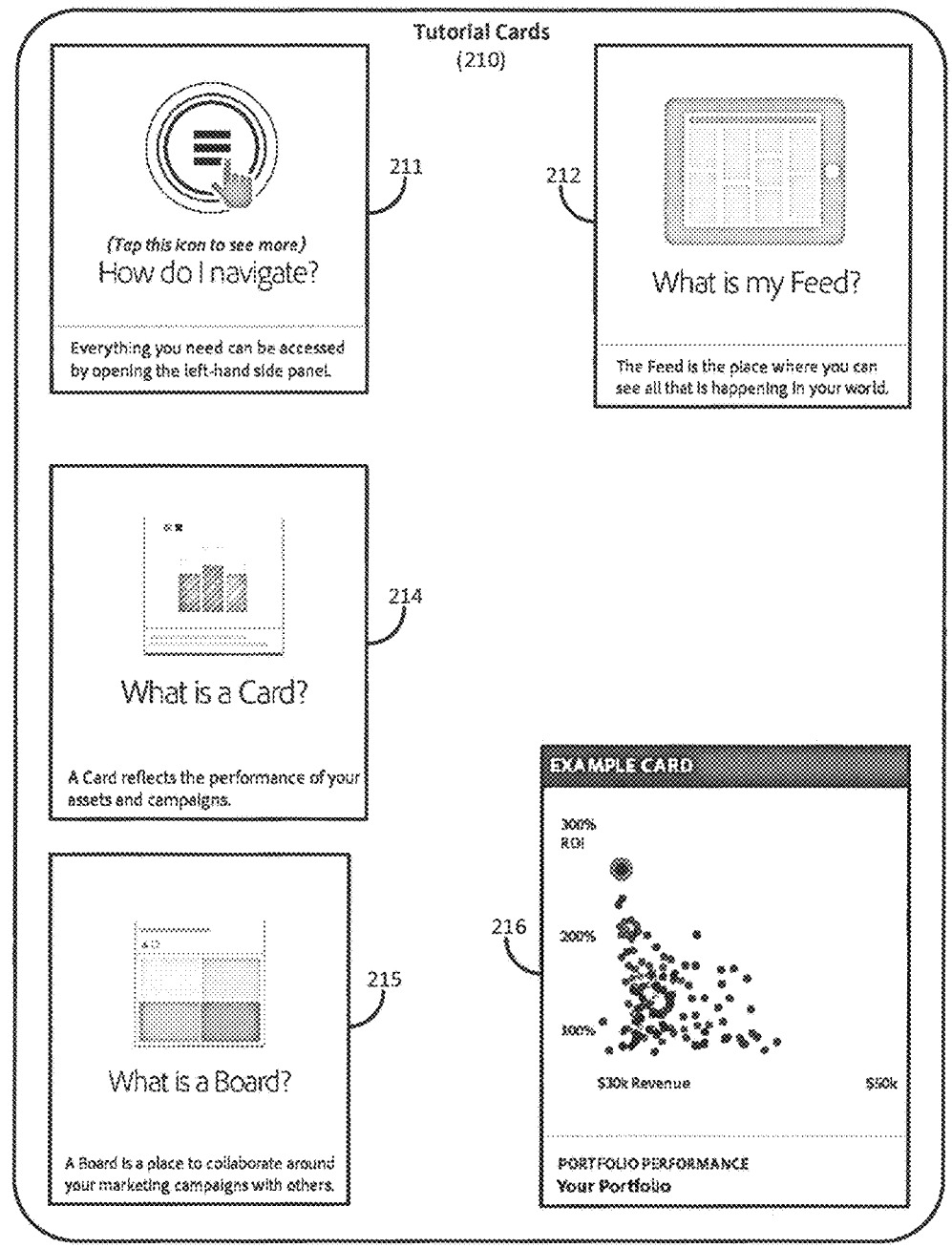

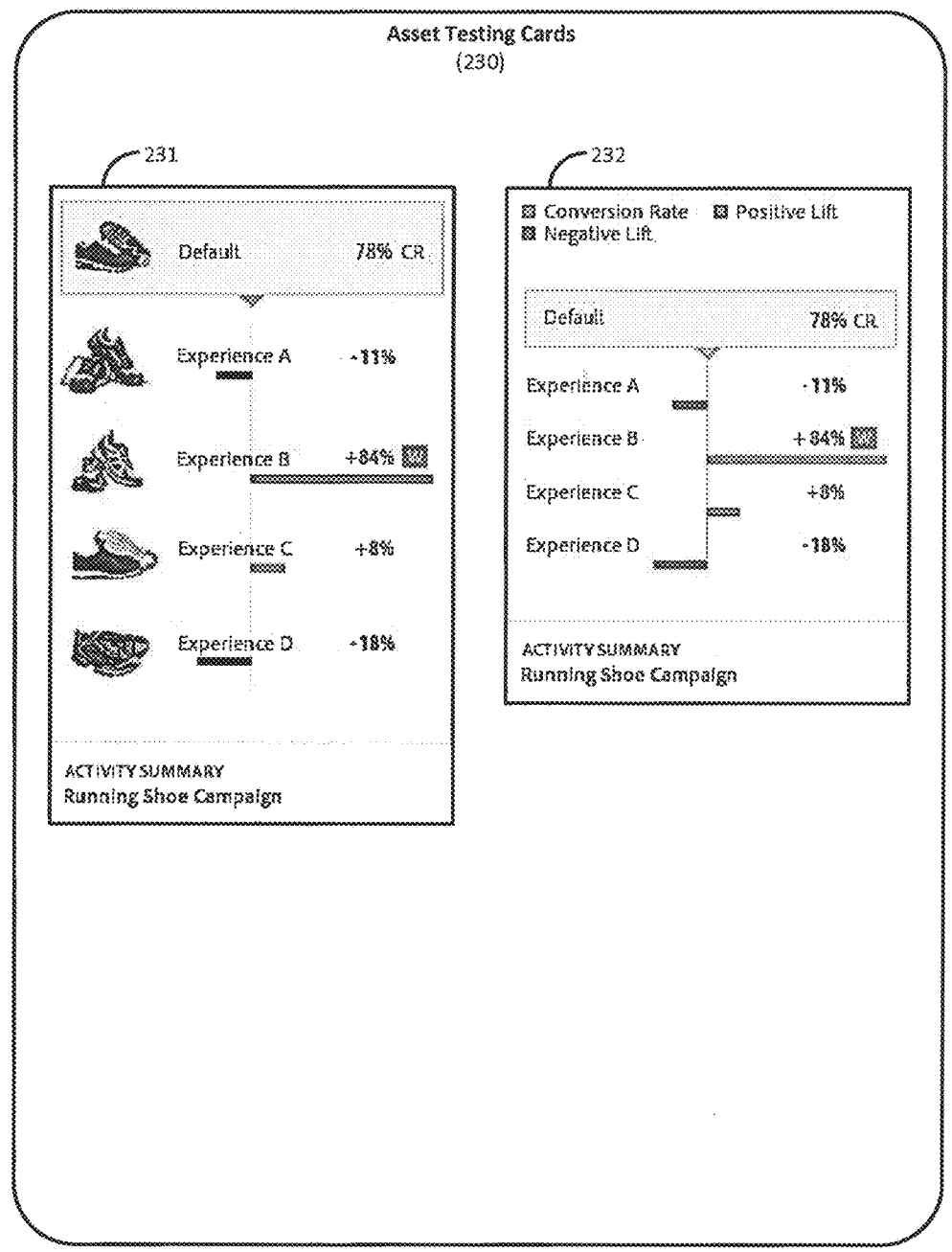

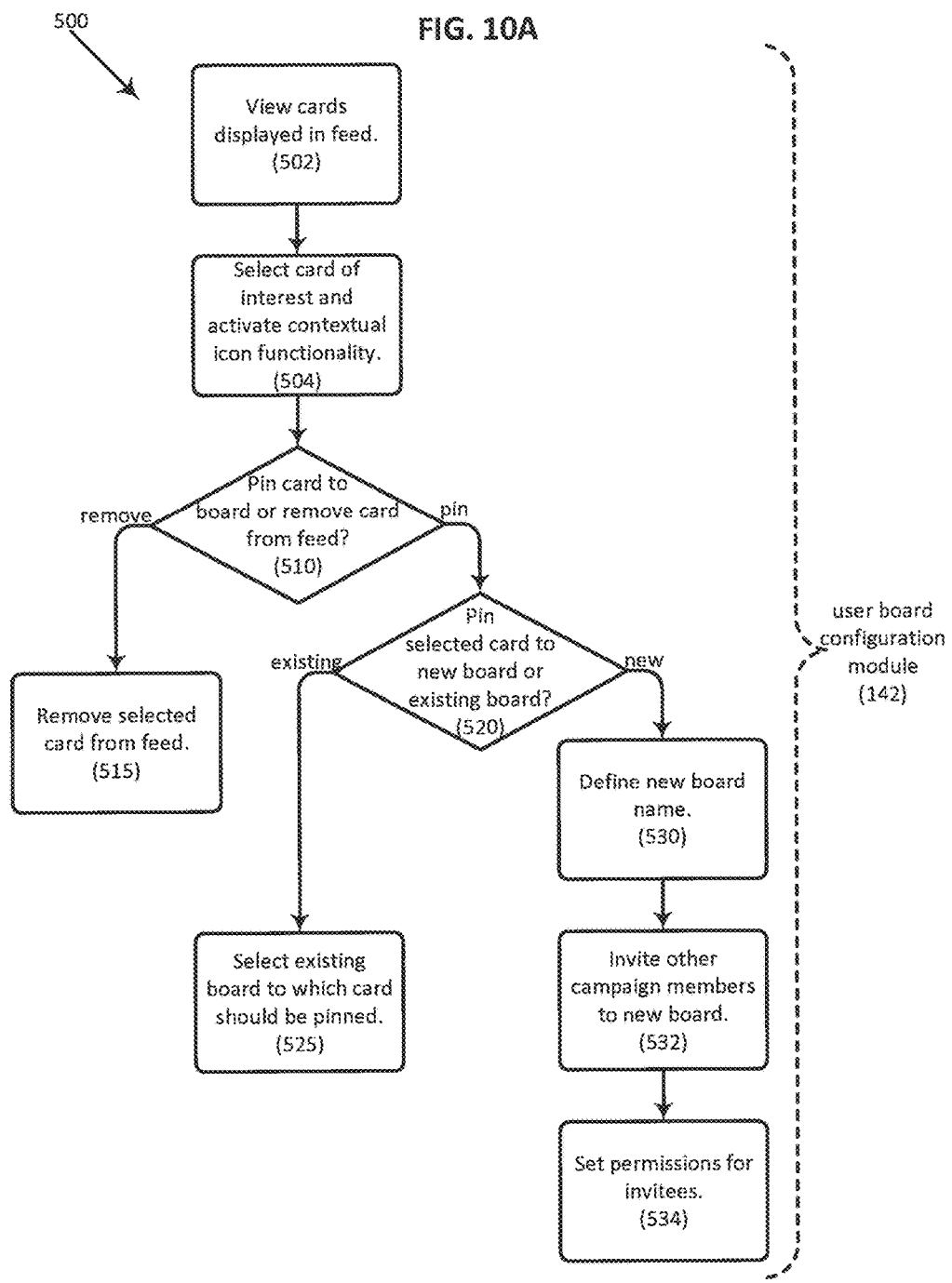

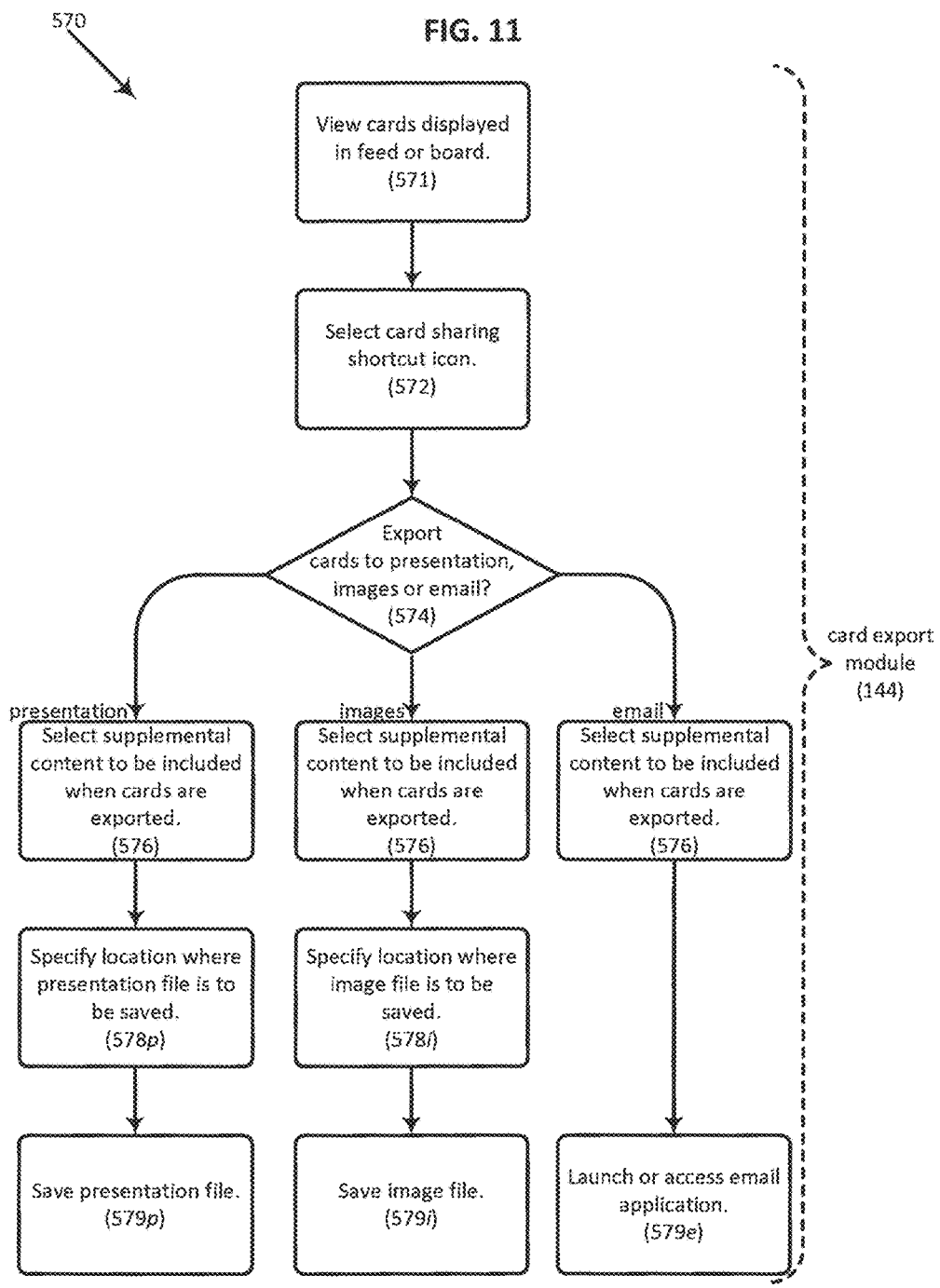

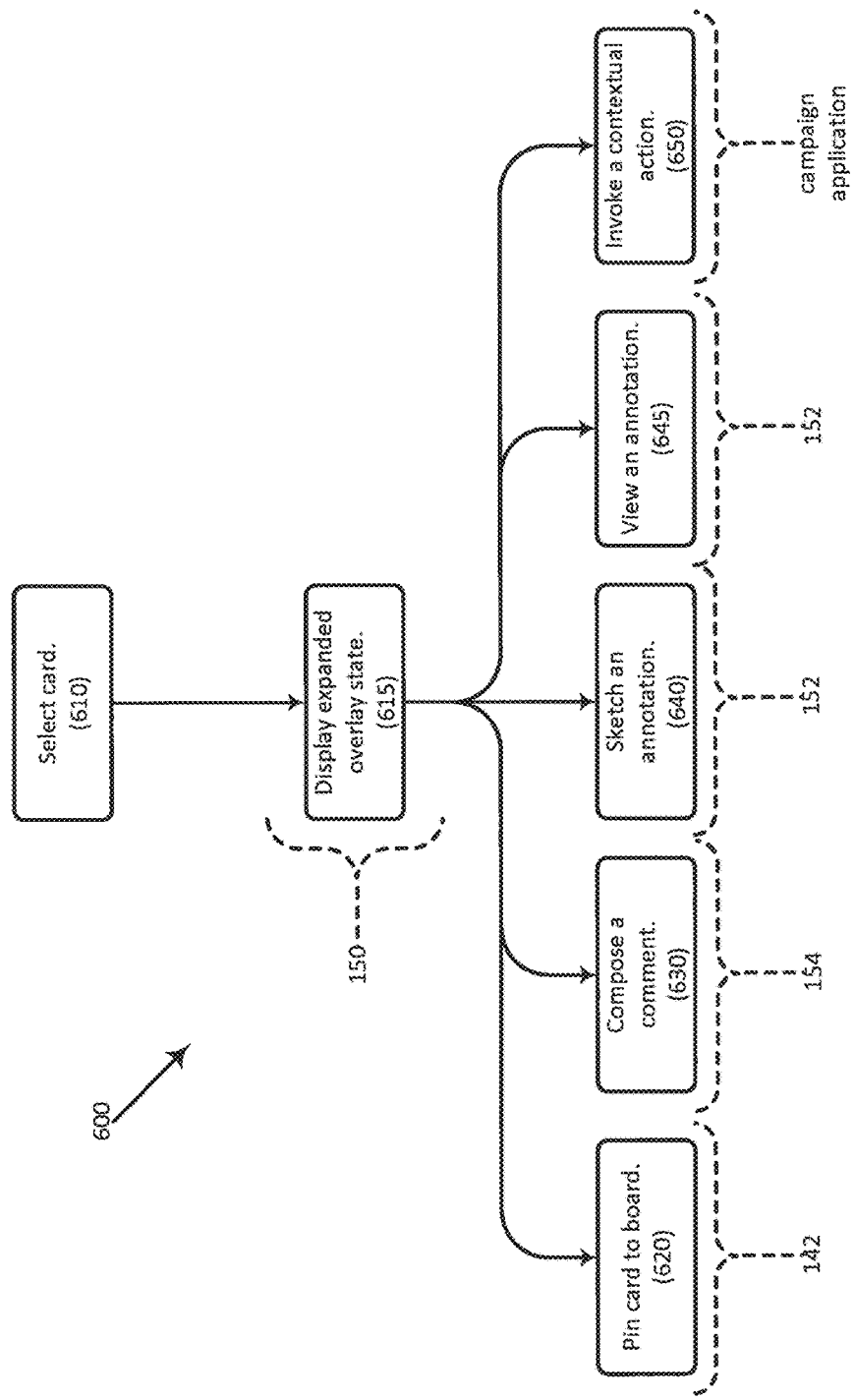

CAMPAIGN PERFORMANCE DATA SNAPSHOT CARDS

FIELD OF THE DISCLOSURE

This disclosure relates generally to management of campaign data, and more specifically, to systems and methods that facilitate data sharing and collaboration among individuals working on a coordinated campaign.

BACKGROUND

A campaign, such as a marketing campaign, often involves distinct groups of people working toward a common goal. For example, a print media team, a promotions team and a social marketing team might work on a multi-faceted marketing campaign to launch a new line of outdoor apparel. During the course of such a campaign, these teams collect and analyze data relating to their respective segments of the campaign. The teams can use the results of such analysis to evaluate the efficacy of their efforts and make appropriate adjustments to their portions of the overall campaign. For example, the print media team might discover that newspapers are a more effective advertising medium than magazines and adjust their advertisement placement strategy accordingly. Or the social networking team might discover that Facebook posts generate more web traffic than Twitter tweets and adjust their promotions strategy accordingly. Such ongoing evaluation and adjustment is important to the overall success of the campaign.

BRIEF DESCRIPTION OF THE DRAWINGS

FIG. 5A is a collection of screenshots illustrating the example tutorial cards of FIG. 4.

FIG. 5C is a collection of screenshots illustrating the example asset testing cards of FIG. 4.

FIG. 10A illustrates a methodology for curating cards from a feed to new or existing boards in accordance with an embodiment of the present invention.

FIG. 11 illustrates a methodology for exporting cards from a feed or board to external formats in accordance with an embodiment of the present invention.

FIG. 13A illustrates a methodology for invoking an expanded overlay state to access more detailed data and additional functionalities associated with a campaign data snapshot card in accordance with an embodiment of the present invention.

DETAILED DESCRIPTION

Figure 1:
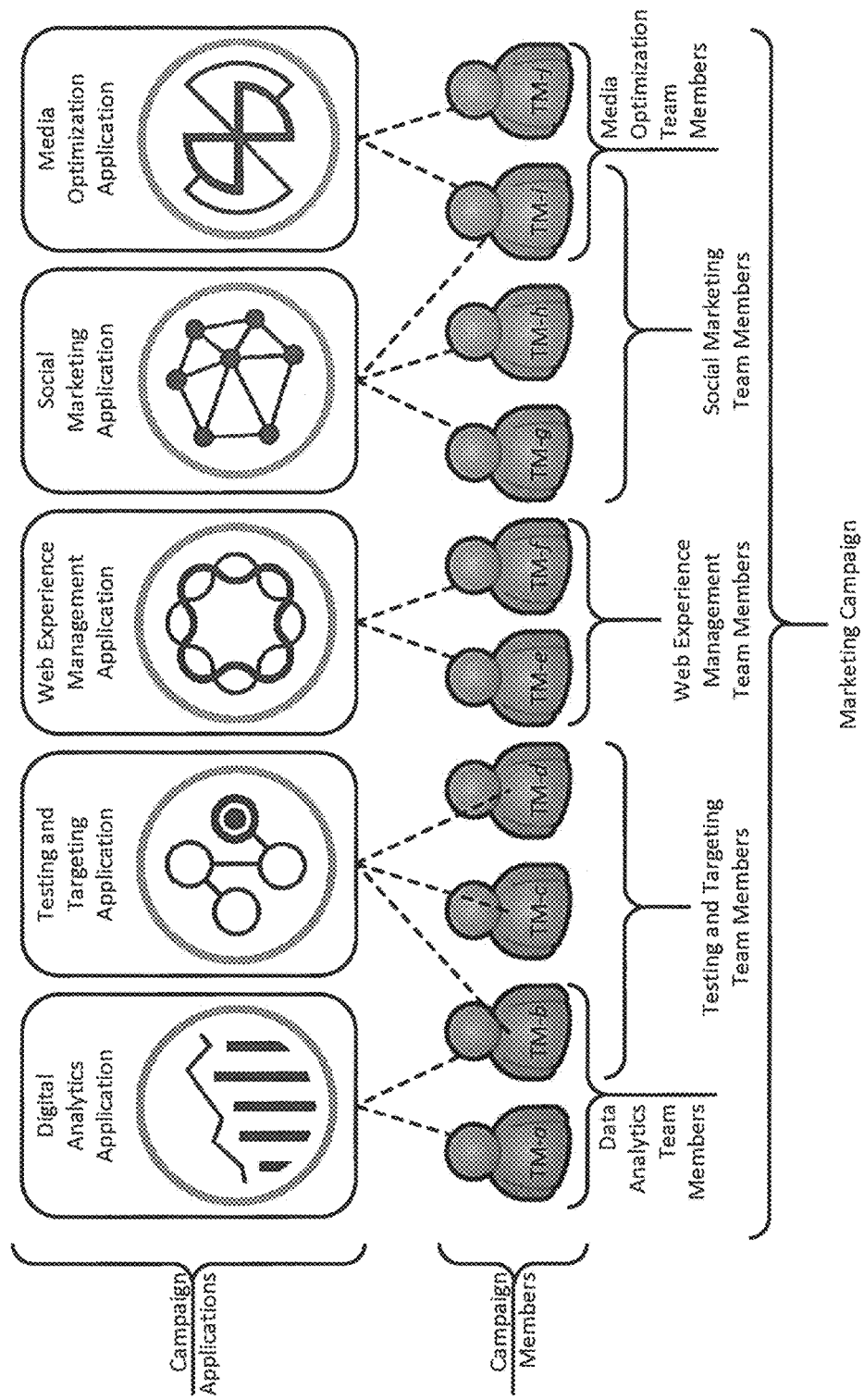
FIG. 1 is a block diagram that schematically illustrates the organizational structure of an example online marketing campaign.

Systems and methods are disclosed for facilitating collaboration amongst individuals working on a coordinated campaign. One example of such a coordinated campaign is an online marketing campaign that comprises a plurality of teams, each team including one or more team members working toward certain goals. In furtherance of these goals, the individual team members use technical resources provided by specialized tools, which are also sometimes referred to as applications or products. Some applications may be shared by multiple teams, while other applications may be used exclusively by a single team. As the campaign progresses, these applications may generate a large volume of data, some of which may be useful to teams other than those which were originally responsible for producing the data. For example, a social marketing team may use an application that generates data indicating that followers of a certain movie star are expressing interest in a new line of sunglasses; such data would also be useful to a targeted content team responsible for deciding which websites should be targeted with banner advertising for the sunglasses. In certain embodiments a campaign manager platform is used to facilitate data sharing and collaboration amongst the various teams that comprise a campaign. In such embodiments the individual team members interact not only with the applications specifically adapted for their team, but also with the campaign manager platform, which provides a medium for exchanging data from diverse tools and applications adapted for use by other teams, as well as ideas with other teams. This configuration advantageously facilitates data sharing and collaboration amongst the various teams, thereby enhancing the overall success of the campaign.

General Overview

The rapid growth of the Internet has presented marketers with both opportunities and challenges. The large number of people with access to the Internet has allowed business owners to reach a far larger and more diverse audience of potential customers than ever before. However, this vast audience has attracted a commensurately large number of businesses attempting to reach those potential customers, each trying to set itself apart from the competition. Adding to this challenge is the fact that online marketing campaigns are becoming increasingly complex and often involve multiple teams working on disparate aspects of the campaign, such as data analytics, content testing and targeting, website experience management, social marketing and media optimization. While specialized applications have been developed for these and other aspects of a marketing campaign, the result is that marketers tend to work with applications that are specifically tailored to their individual roles within the campaign. Such applications may not be geared toward interdisciplinary collaboration between the various teams that comprise the overall campaign. As a result, marketers often have difficulty in packaging and distributing the insights gleaned from their specifically tailored applications to other campaign members in a way that is visually easy to comprehend and tactically easy to act upon.

The significance of these challenges is particularly evident when viewed within the framework of a campaign with many collaborative actors working in discrete teams, such as an online marketing campaign. FIG. 1 is a block diagram that schematically illustrates the organizational structure of an example online marketing campaign. The marketing campaign comprises a plurality of teams working toward discrete goals that, when taken together, define the overall goals of the campaign. For example, the marketing campaign illustrated in FIG. 1 includes a data analytics team, a testing and targeting team, a web experience management team, a social marketing team, and a media optimization team. Each team is further comprised of one or more individuals or "team members". For instance, the data analytics team comprises two team members TM-a and TM-b, while the social marketing team comprises three team members TM-g, TM-h and TM-i. In some cases, an individual may work with more than one team, such as team member TM-i, who works with both the social marketing team and the media optimization team. Each individual involved in the campaign can be considered as both a "team member" working with one or more teams, as well as a "campaign member" working on the overall marketing campaign. Each team uses one or more specialized applications that help the constituent team members achieve their goals. For example, web experience management team members TM-e and TM-f use a web experience management application that helps them manage how visitors interact with a website. Specialized applications such as these generate data and provide analysis that the respective team members can use to make ongoing adjustments to their segment of the marketing campaign, thereby improving the success of the overall campaign. In the case of an online marketing campaign, such applications can be referred to as "digital marketing applications". Data generated by the various specialized applications used in a coordinated campaign are collectively referred to herein as "campaign data" or "campaign application data" which may be used interchangeably. It will be appreciated that the organizational structure illustrated in FIG. 1 is only one example of a marketing campaign, and that in other embodiments other numbers and types of applications, teams and team members can be provided.

As noted previously, this campaign structure and the use of such specialized applications by discrete teams is not always conducive to interdisciplinary collaboration. As a result, it can be difficult to streamline communication and collaboration between disparate campaign members when a particular insight exists only within the specific team where it originates. For example, referring still to FIG. 1, it would be difficult for team member TM-a of the data analytics team to share an insight gleaned from the digital analytics application with team member TM-j of the media optimization team. That is, given the wide variety of different roles within the campaign structure, and the different applications used by the different teams, important insights may only be seen by certain campaign members, rather than being distributed to any member to whom it would be relevant. Moreover, campaign members working within this organizational framework tend to be inundated with large amounts of specialized data and do not have resources that are appropriate for curating, discussing and sharing the insights gathered from their specialized applications.

As a result, there is often a disconnect between viewing a report on a campaign tactic and modifying the tactic to actively improve or optimize it. This results in missed optimization opportunities when a team member discovers an insight that is related to his/her area of expertise, but lacks the ability to effectively and efficiently share that insight with other campaign members. To this end, campaign members working within such a collaborative framework would benefit from a tool allowing them to transform streams of specialized data into a more meaningful collection of modular insights that relate to the particular intricacies of a marketing campaign. The ability to present or report on this data outside the confines of a tool-specific environment would further facilitate the process of sharing such insights with a larger circle of stakeholders outside the campaign, and in a manner that allows insights garnered from one tool-specific environment to be presented in an actionable format for those unfamiliar with that particular tool.

Thus, and in accordance with certain embodiments of the present invention, systems and methods are provided herein that facilitate data sharing and collaboration among individuals working on a coordinated campaign, such as a marketing campaign. Such systems and methods use a campaign manager platform to aggregate campaign application data from one or more applications distributed across the campaign and selectively summarize and present such data to team members in an actionable format. Data aggregated and summarized in this way are referred to herein as "campaign data snapshot cards", "data snapshot cards", "data cards", or simply, "cards". Such cards comprise a user interface that can be used to present the aggregated data to campaign members using a wide array of different formats. For example, in one embodiment a campaign data snapshot card comprises a user interface having a rectangle or rectangle-like shape that includes textual and/or graphical data relating to the marketing campaign. In such embodiments, the card occupies a segment of, and can be adjustably positioned within, a larger user interface. In embodiments that include multiple cards, the multiple cards can have a similar dimension, such as a similar width, thus further facilitating arrangement of the cards within the larger user interface, such as within existing columns.

The campaign data snapshot cards can be used to present a wide variety of data to the campaign members, including dynamically changing data, static data and hyperlinks to other resources. For example, in one embodiment the cards include tutorial cards that provide textual and graphical information regarding the operation of the campaign manager platform. In other embodiments the cards contain hyperlinks to access one or more of the campaign applications. In still other embodiments the cards contain dynamically changing marketing data aggregated from the campaign applications; such data can be presented with a graphical and/or numerical layout. For example, in one such embodiment a campaign data snapshot card includes a over-time line graph having numerical labels indicating certain values of interest. The line graph optionally includes thumbnail images relating to graphed data. In still other embodiments the cards contain media assets, such as photographs, links to videos, content of social media postings and the like. It will be appreciated that the cards may have other features and/or visual appearances in other embodiments, and that the present invention is not intended to be limited to any particular physical configuration of the card or graphical layout of the information presented therein.

Using a campaign manager platform to generate and distribute campaign data snapshot cards enables team members to share campaign tactics with individuals outside their immediate team, thereby allowing value and actionable insights to be shared across the entire campaign as opposed to only within a single team. As will be further appreciated, presenting the cards in a simplified, visual way allows individuals who may not be familiar with a particular campaign application to benefit from data generated by that application. Furthermore, providing the cards with a modular format that allows them to be easily manipulated and arranged within a larger user interface allows campaign members to customize personal collections of cards in a way that has particular meaning and/or utility for members of a team or of the marketing application as a whole.

Data snapshot cards generated by the campaign manager platform can be used to provide campaign members with an understanding of data metrics that relate to different aspects of the overall campaign. Examples of such aspects include the channels via which the campaign communicates, the specific content or information that the campaign distributes, and the tactics which the campaign uses to distribute its content. The cards can capture other aspects of the campaign in other embodiments. The cards are optionally dynamically updated as new information continues to be received from the various applications, thereby providing campaign members with live data metrics that can be updated on a continuous, periodic or as-needed basis. In such embodiments the campaign manager serves as a shared platform that provides both the ability to create data snapshot cards from an entire suite of potentially disparate campaign applications, as well as an ecosystem in which such cards can be viewed. Thus certain embodiments disclosed herein are scalable in the sense that a wide variety of different data aggregation applications can be tethered to the campaign manager to allow specialists in a certain field to share simplified insights from their portion of the campaign to the campaign as a whole. This facilitates cross-discipline collaboration, allowing all campaign members to leverage key insights derived from a broader community of experts. In the case of a marketing campaign, the campaign manager platform allows marketers to improve and optimize their campaign based on insights gleaned from more interconnected campaign members.

For example, a marketing campaign may comprise teams of one or more experts focused on aspects of the campaign such as social media management, webpage testing, content generation, audience targeting and search engine optimization. An expert marketer focused in one of these areas will generally be familiar with the specialized applications used to collect and analyze data relating to his/her respective aspect of the campaign. Thus the expert marketer will monitor the activity of the larger campaign through the lens of such specialized applications, and will seek to optimize the effectiveness of the overall campaign by learning about and modifying tactics that relate to his/her specific area of expertise. This expert marketer will also realize that the key insights that surface in his/her particular area of expertise would also be valuable to other campaign members focused on other aspects of the campaign who may not have access to the same data or specialized applications. Certain embodiments of the systems and methods disclosed herein can be used to facilitate the sharing of this data with campaign members working with other teams. For example, the aforementioned campaign manager platform can be used to create sharable data snapshot cards which are formatted in such a way as to allow campaign members who are not experts in the field where the data originated to be able to understand and apply the information presented therein. This allows disparate insights generated across a large marketing campaign that touches upon a wide variety of disciplines to be aggregated into a shared environment where such insights can be easily understood, discussed and applied to other aspects of the campaign.

In certain embodiments the campaign manager provides a collaborative platform that allows campaign members to view data snapshot cards of campaign tactics that are related to their work. The cards can be presented and organized, for example, in a customized "feed" or a customized "board". A feed is a collection of data snapshot cards that is dynamically updated according to a relevancy algorithm that depends on factors such as the feed owner's role in the overall campaign, the data contained in a particular card, and the aging of such data. A campaign member can curate a subset of the cards contained within his/her feed into a board that can be shared with other campaign members, wherein the presentation and organization of the cards collected on the board are persistent. Thus, while the feed can provide a continually updated list of relevant campaign tactics for a particular campaign member, a board can be shared by a group of campaign members, and can be configured to change only when new cards are added or removed by those sharing the board, or when the data presented in the cards changes. A board therefore provides a campaign member with an easy way to share data snapshot cards with other campaign members whose role in the campaign is related to the shared cards. The feeds and boards collectively provide a platform for the entire breadth of campaign members to discover and share new insights about a particular campaign. In particular, they allow campaign members to curate a large amount of data into smaller subsets of more meaningful insights, and invite other team members working on similar initiatives to discuss and collaborate on the optimal way to move forward based on the insights gleaned. In addition to being able to manage the card feeds and boards, the campaign manager platform is also optionally capable of exporting the cards contained within feeds and/or boards into a presentation format that allows campaign members to share their insights with other stakeholders outside the collaborative ecosystem.

For example, in one embodiment a campaign member viewing a customized feed will see data snapshot cards that are organized based on the member's role in the overall campaign, the particular data contained in the cards, and the aging of such data. This customized feed helps the campaign member discern key insights that may further advance the overall success of the campaign. For example, the campaign member might recognize that a baseball team's fan bulletin board is a significant source of web traffic during baseball games. Upon making such a recognition, the campaign member can select certain cards from his/her feed and add those cards to a new board related to that particular insight. The campaign member can also invite other campaign members who would have reason to discuss and review the insight to join the new board. The invitees may or may not work on the same team as the campaign member who created the new board. The board provides an environment where the board creator and invitees can discuss the data contained in the cards and visually annotate areas of particular interest. When a conclusion is reached about the insights to be gleaned from the cards linked to the board, the cards can be exported, optionally including comments and annotations, into a format that is conducive to presenting to stakeholders outside the collaborative campaign. This process of discovering insights from a relevant feed of campaign information, curating data snapshot cards that represent those insights into a persistent collection (board), collaborating with other campaign members about how the data snapshot cards relate to other portions of the overall campaign, and presenting the resulting findings in a way that aligns with campaign goals can be repeated many times over the course of a campaign lifecycle, thereby significantly increasing the likelihood of success of the overall campaign.

In certain embodiments the campaign data snapshot cards can be provided with an expanded overlay state that provides additional, context-specific functionality in a unified platform. Like the snapshot card, the expanded overlay state can also optionally be dynamically updated as new information continues to be received from the various sourcing applications. This allows campaign members to view a more detailed version of a selected snapshot card and access functionalities provided by the application that provided the data for the selected card. This provides campaign members with the ability to modify and optimize selected aspects of the campaign through contextual actions that are related to the performance metrics provided in the cards. The expanded overlay state can additionally or alternatively be configured to allow campaign members to collaborate and communicate with each other about the data presented in the card through textual comments and visual annotations. Providing a more detailed view of the data visualization represented on a card, and providing tools to comment, annotate and collaborate with a larger segment of the campaign members, allows insights gleaned from the expanded overlay state to be quickly and easily communicated and acted upon.

For example, in one embodiment a campaign member viewing a feed or board can select a snapshot card that seems particularly relevant or interesting to that member's work. Selecting the card of interest reveals an expanded overlay state that provides a more detailed view of the data visualization. In certain embodiments the expanded overlay state also provides access to functionality that allows the campaign member to edit a related campaign tactic using the application that originally sourced the data appearing on the card of interest. The campaign member can share the insights and key findings revealed in the expanded overlay state with other members of the campaign by writing comments directed toward particular individuals and/or adding visual annotations to the data visualization. Recipients of such comments and/or annotations can see the expanded data overlay, respond to the original message, and add additional annotations as desired. The contextual actions provided in such an expanded overlay state optionally depend on the team affiliation of the campaign member viewing the overlay. For example, a member of the data analytics team may have access to different functionalities than a member of the social marketing team, even which such team members view the same expanded overlay state. Such an expanded overlay state allows campaign members to review insights in more detail and collaborate with other campaign members regarding such insights, thus further facilitating the process of optimizing the tactics of the overall campaign.

System Architecture

Figure 2:
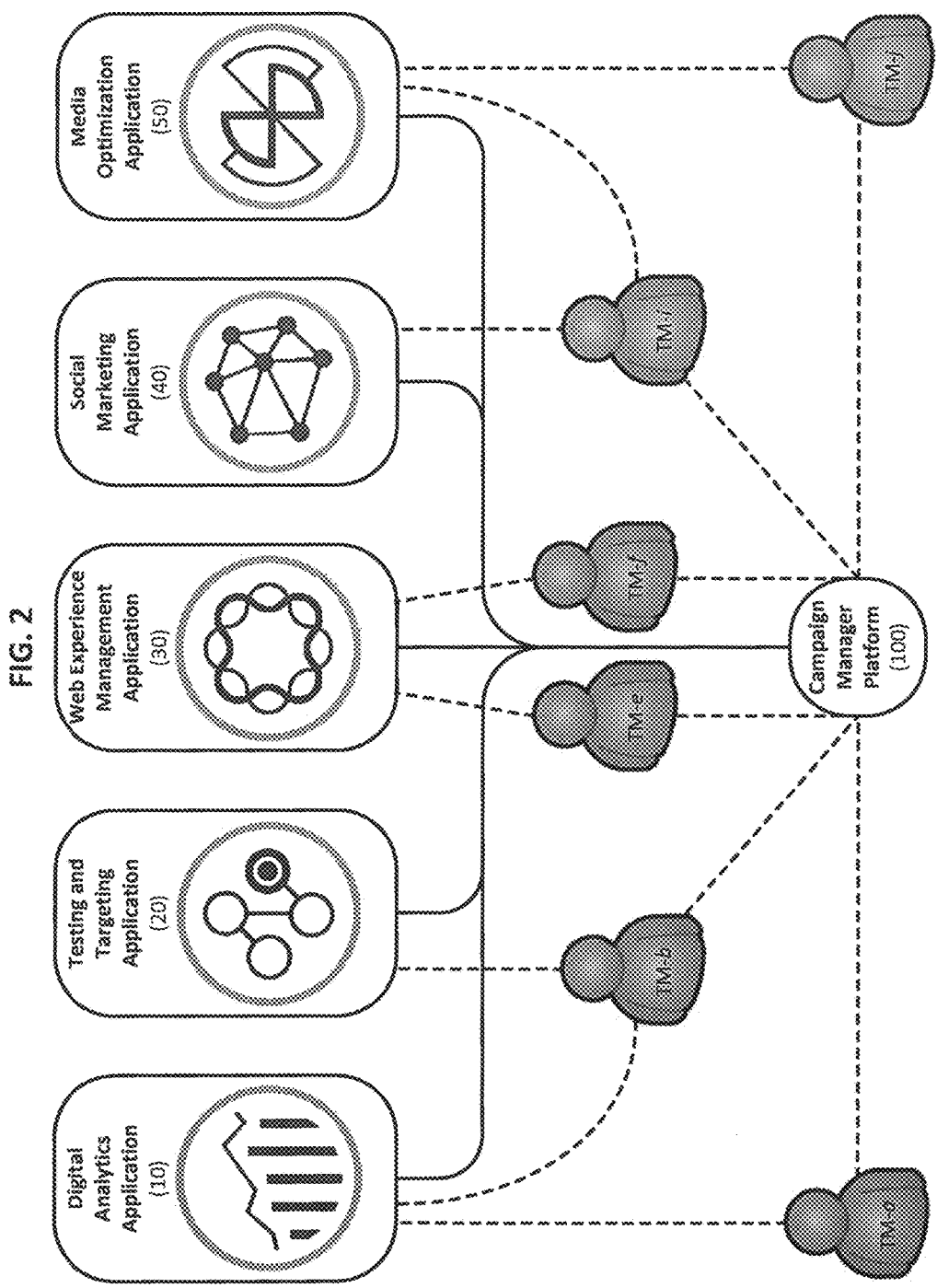
FIG. 2 is a block diagram schematically illustrating selected components of a system for using a campaign manager to coordinate different aspects of a marketing campaign in accordance with an embodiment of the present invention.

FIG. 2 is a block diagram schematically illustrating selected components of a system for using a campaign manager platform to coordinate different aspects of a marketing campaign in accordance with an embodiment of the present invention. The marketing campaign of FIG. 2 includes a plurality of team members TM-a, TM-b, . . . TM-j who interact with one or more specialized campaign applications that help that the team members achieve their respective goals. For example, team member TM-a interacts with digital analytics application 10; team member TM-b interacts with digital analytics application 10 and testing and targeting application 20; team members TM-e and TM-f interact with web experience management application 30; team member TM-i interacts with social marketing application 40 and media optimization application 50; and team member TM-j interacts with media optimization application 50. As described above with respect to FIG. 1, the team members can be allocated into teams that comprise the overall marketing campaign. Additional team members are not illustrated for purposes of clarity in FIG. 2, and it will be appreciated that the present invention is not intended to be limited to any particular number or type of campaign applications, team members, or relationship between such applications and team members. Likewise, it will also be appreciated that additional and/or alternative campaign applications can be used in other embodiments.

A wide variety of campaign applications can be used to implement the functionality provided by the particular applications illustrated in FIG. 2. For example, the digital analytics application 10 can comprise any suitable application that is capable of providing analytical information about digital marketing strategies and initiatives for purposes of understanding and optimizing web usage. Digital analytics applications can be used, for instance, to generate information about the number of visitors to a website, the geographic location of site visitors, the number of page views and how traffic at a particular site changes over time. Such information can be produced using a wide array of data collection techniques, including web server logfile analysis, page tagging, Internet Protocol address location, click analytics and browser cookie analysis, to name a few. The campaign data generated by a digital analytics application are referred to herein as "campaign status data"; examples of such data include conversion rate data for a web-based marketing campaign and ranking data for resource allocation to various channels in a marketing campaign. Campaign status data can be presented in a wide variety of formats, including bar charts, over-time charts, tabular reports and single value reports. In one embodiment the functionality of the digital analytics application 10 is provided by Adobe® SiteCatalyst®, available from Adobe Systems Incorporated of San Jose, Calif., although other applications can be used in other embodiments. Other suitable digital analytics applications having comparable or otherwise competing functionality may be used as well.

The testing and targeting application 20 can comprise any suitable application that is capable of providing analysis of the content deployed on a particular website. Testing and targeting applications can be used to design test pages and preform A/B and/or multivariate testing of such pages to determine which content is most likely to optimize revenue generation for a particular audience segment. Such applications can also be used to create and automatically personalize campaign assets that are specifically targeted for such audience segments. Features such as these can be implemented using traffic analysis and content management tools. The campaign data generated by a testing and targeting application are referred to herein as "test result data"; examples of the data generated by a testing and targeting application include multivariate testing result data and conversion rate ranking data for various targeted advertising campaigns. Such data can be presented in a wide variety of formats, including bar charts, over-time charts and single-value reports. In one embodiment the functionality of the testing and targeting application 20 is provided by Adobe® Test&Target™, available from Adobe Systems Incorporated of San Jose, Calif., although other applications can be used in other embodiments. Other suitable testing and targeting applications having comparable or otherwise competing functionality may be used as well.

The web experience management application 30 can comprise any suitable application that is capable of managing a website that includes a variety of different experiences for different audience segments. Examples of such experiences include a mobile experience for a website visitor using a smartphone, a touchscreen experience for a website visitor using a tablet, or a time-based experience for a user visiting during a particular time of day. Web experience management applications allow campaign members to define specifically targeted web experiences for specific audience segments; this can be accomplished by an application that provides the ability to manage and personalize web content, deliver dynamically generated content, and analyze how such content is consumed by visitors. Examples of the data generated by a web experience management application include ranking data for various user profiles and conversion rate data for targeted content used in an online marketing campaign. Such data can be presented in a wide variety of formats, including pie charts, bar charts, over-time graphs and tabular reports. In one embodiment the functionality of the web experience management application 30 is provided by Adobe® Experience Manager, available from Adobe Systems Incorporated of San Jose, Calif., although other applications can be used in other embodiments. Other suitable web experience management applications having comparable or otherwise competing functionality may be used as well.

The social marketing application 40 can comprise any suitable application that is capable of analyzing marketing campaigns that use social media to determine how effectively such campaigns generate revenue. For example, social marketing applications can be used to determine how a particular Twitter tweet or Facebook post may have affected revenue, or to identify social media users who have the ability to influence a marketing campaign. Social marketing applications may also be used to generate social media based applications specifically intended to be used in a way that allows customers to interact with each other. Social marketing applications provide the ability to manage a personalize social media campaigns and analyze the traffic generated by such campaigns. The campaign data generated by a social marketing application are referred to herein as "social networking data"; examples of such data include data tracking mentions of a brand keyword on Twitter, data tracking the number of friends in a Facebook campaign, or the number of times a particular media asset has been shared over a social network. Social networking data can be presented in a wide variety of formats, including bar charts, over-time charts, tabular reports and single value reports. In one embodiment the functionality of the social marketing application 40 is provided by Adobe® Social, available from Adobe Systems Incorporated of San Jose, Calif., although other applications can be used in other embodiments. Other suitable social marketing applications having comparable or otherwise competing functionality may be used as well.

The media optimization application 50 can comprise any suitable application that is capable of managing and optimizing resources spent in a marketing campaign. For example, such an application could be used to generate efficient bidding strategies in auction-based digital advertising markets. Media optimization applications can use predictive modeling techniques to identify opportunities where marketing resources are likely to generate a large return on investment with respect to impression-level bidding, search engine placement and social advertisement buying. Such predictive models can be based on data collected from a wide variety of web analytics applications and inventory information provided by advertisement placement suppliers. In one example embodiment the functionality of the media optimization application 50 is provided by Adobe® AdLens™, available from Adobe Systems Incorporated of San Jose, Calif., although other media optimization applications can be used in other embodiments. Other suitable media optimization applications having comparable or otherwise competing functionality may be used as well.

Still referring to the example embodiment illustrated in FIG. 2, the marketing campaign further includes a campaign manager platform 100, which is also referred to herein as a "campaign manager". The campaign manager platform 100 communicates with the various campaign applications, as indicated by sold lines, and also communicates with the plurality of team members, as indicated by broken lines. Thus the individual team members interact not only with the campaign applications with which they are associated, but also with the campaign manager platform 100. The campaign manager therefore enables data to be distributed from a campaign application (for example, the digital analytics application 10) to a team member that may not be directly associated or communicating with that application (for example, team member TM-j). The campaign manager also provides a communication link between individuals on different teams, such as between team members TM-b and TM-i. This kind of inter-team communication is non-existent in the organizational structure illustrated in FIG. 1. Thus the campaign manager platform 100 advantageously promotes better data distribution throughout the marketing campaign.

The team members can interact with the campaign applications and the campaign manager platform 100 using any suitable computing device, such as a desktop computer, a laptop computer, a tablet computer or a mobile phone. Such computing devices may include, for example, a processor, a memory, a user interface and other components configured to meet the computational demands of the various systems and methods disclosed herein. For example, in one embodiment the team members interact with the campaign applications using a tablet computer having a touch-sensitive user interface. The campaign manager platform 100 and the campaign applications can be implemented in software, such as a set of instructions encoded on a suitable computer readable medium that, when executed by one or more processors, cause the various methodologies provided herein to be carried out. The instructions can be encoded using a suitable programming language, such as C, C++, object-oriented C, JavaScript, Perl, PHP or BASIC, or alternatively, using custom or proprietary instruction sets. The computer readable medium may be a non-transient storage medium for storing digital information, such as a hard drive, a server, flash memory and/or random access memory. In alternative embodiments, the components and/or modules can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the functionality described herein. It will be apparent that any suitable combination of hardware, software and firmware can be used in the implementation of the various aspects of the campaign illustrated in FIG. 2.

Any suitable network can be used as a medium for communications between the campaign applications, the team members and the campaign manager platform 100. The network may be a public and/or private network, such as a private local area network operatively coupled to a wide area network such as the Internet. The network connections can be wired, wireless or some combination of wired and wireless connections. In some cases, access to certain computing resources may require credentials such as usernames and passwords or any other suitable security mechanism. For example, in one embodiment the team members interact with the campaign applications and/or the campaign manager platform 100 in a web-based, client-server environment. This advantageously allows the team members to use the familiar interface of a web browser (client) to access the specialized functionalities provided by the campaign applications and/or the campaign manager platform 100 (one or more servers). Such an environment can be implemented, for instance, using among other things JavaScript or other browser-based technology that is hosted on a given web server. Numerous other configurations and variations will be apparent in light of this disclosure.

Figure 3:
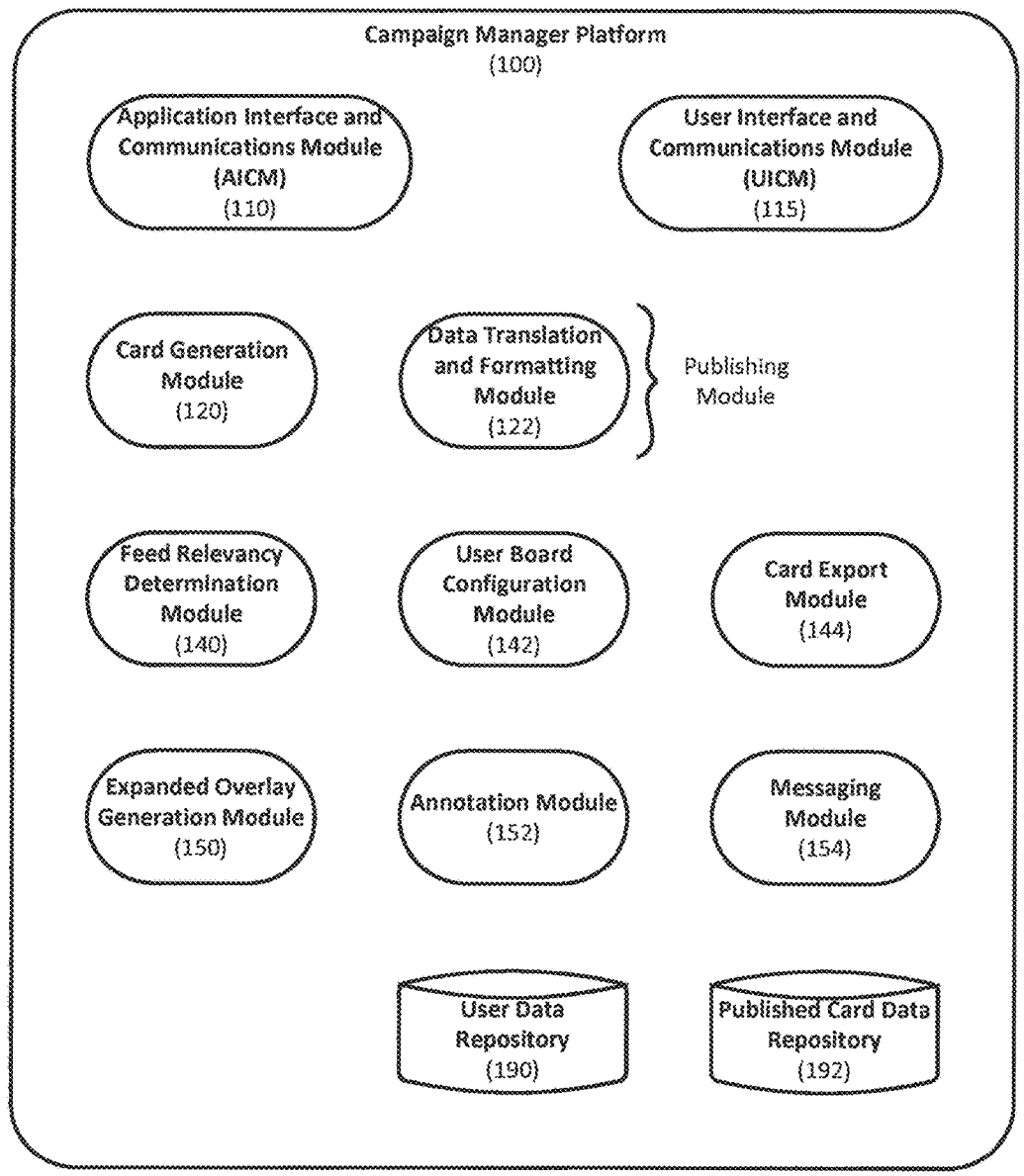
FIG. 3 is a block diagram schematically illustrating selected modules that comprise one embodiment of the campaign manager of FIG. 2.

The various functionalities of the campaign manager platform 100 described herein can be implemented using a variety of different modules and/or sub-modules. FIG. 3 is a block diagram schematically illustrating selected modules that comprise one example embodiment of the campaign manager platform 100 illustrated in FIG. 2. Such modules include an application interface and communications module (AICM) 110 configured to provide a communications interface with the various campaign applications that are linked to the campaign manager platform 100. For example, in one embodiment the AICM 110 is capable of receiving data from the various campaign applications and providing user instructions to such applications. The campaign manager platform 100 may also include a separate user interface and communications module (UICM) 115 configured to provide a communications interface with the various team members that have access to the campaign manager platform 100. For instance, in one embodiment the UICM 115 is capable of sending data to, and receiving user input from, the various team members. Examples of such data and user input include campaign snapshot card data, user-to-user messages and annotations, commands to create new card boards, and invitations to joint existing card boards. The AICM 110 and UICM 115 can be further configured to communicate with the various other modules that comprise the campaign manager platform 100. It will be appreciated that in a modified embodiment the functionality of the AICM 110 and the UICM 115 can be incorporated into a single communications module.

In certain embodiments the campaign manager platform 100 further comprises other modules and/or sub-modules configured to provide additional functionalities. For example, card generation module 120 and data translation and formatting module 122 can be configured to compile data collected from one or more of the campaign applications via the AICM 110 and generate one or more campaign data snapshot cards summarizing such data. A feed relevancy determination module 140 and a user board configuration module 142 can be configured to manage the appearance and display of the aforementioned feeds and boards. A card export module 144 can be configured to export campaign data snapshot cards contained within the feeds and/or boards into a presentation format that allows campaign members to share their insights with stakeholders outside the campaign. An expanded overlay generation module 150 can be configured to generate an expanded overlay state for the snapshot cards that provides additional, context-specific functionality in a unified platform. Such an expanded overlay state can include additional data collected from the one or more campaign applications via the AICM 110. An annotation module 152 and messaging module 154 can be configured to provide the expanded overlay with annotation and messaging functionalities that use the UICM 115 to facilitate communications between team members. Other modules providing other functionalities can be provided in other embodiments, and it will be appreciated that the present invention is not intended to be limited to any particular collection or organization of modules that comprise the campaign manager platform 100.

As indicated above, the campaign manager platform 100 provides a communication link between campaign members working on different teams. The campaign manager platform 100 can also provide a communication link between campaign members and campaign applications outside their domain of expertise. In certain embodiments the campaign members can access the campaign manager platform 100 and use the resources it provides from any suitable computing system. For example, a selected campaign member may wish to access the resources provided by the campaign manager platform 100, such as card feeds, card boards, and communication links with other campaign members and/or campaign applications, using both a desktop computer and a tablet computer. In such case, the campaign manager can be configured to store information regarding the campaign member in a user data repository 190. Such information may include, but is not limited to, card data, feed data, board data, usage history, profile information and communication links. For example, in one embodiment the user data repository 190 stores login credential information for selected campaign applications, such that a campaign member who is authenticated to use the campaign manager will automatically be able to access the resources provided by the selected campaign applications without having to resubmit user identification and password information. Storing such information in a centralized data repository advantageously provides campaign members with a uniform user experience regardless of the particular computing system that is used to access the campaign manager platform 100. The campaign manager can also be configured to store information regarding published campaign data snapshot cards in a published card data repository 192, as will be discussed in turn. The data repositories 190, 192 can be implemented using any suitable type of digital storage, such as one or more of a disk drive, flash memory and/or random access memory, and are optionally mirrored across multiple servers so as to provide enhanced security and reliability.

User Interface and Methodology

As described above, systems and methods are provided herein that facilitate data sharing and collaboration among individuals working on a coordinated campaign, such as a marketing campaign. A campaign manager aggregates data from one or more applications and selectively summarizes and presents such data to team members in the form of data snapshot cards. These cards provide a simplified, visual interface that allows campaign members who may not be familiar with the particular campaign application that generated the data presented in the card to benefit from that data. Campaign data snapshot cards can be organized into a customized feed that is dynamically updated according to a relevancy algorithm that depends on factors such as the feed owner's role in the overall campaign, the data contained in a particular card, and the aging of such data. A campaign member can curate a subset of the cards contained within his/her feed into a board that can be shared with other campaign members. The campaign data snapshot cards optionally include an expanded overlay state that provides features such as more detailed data, access to the functionality of the campaign application that provided the data, and the ability to send messages and annotations to other campaign members.

Campaign Data Snapshot Cards

Figure 4:
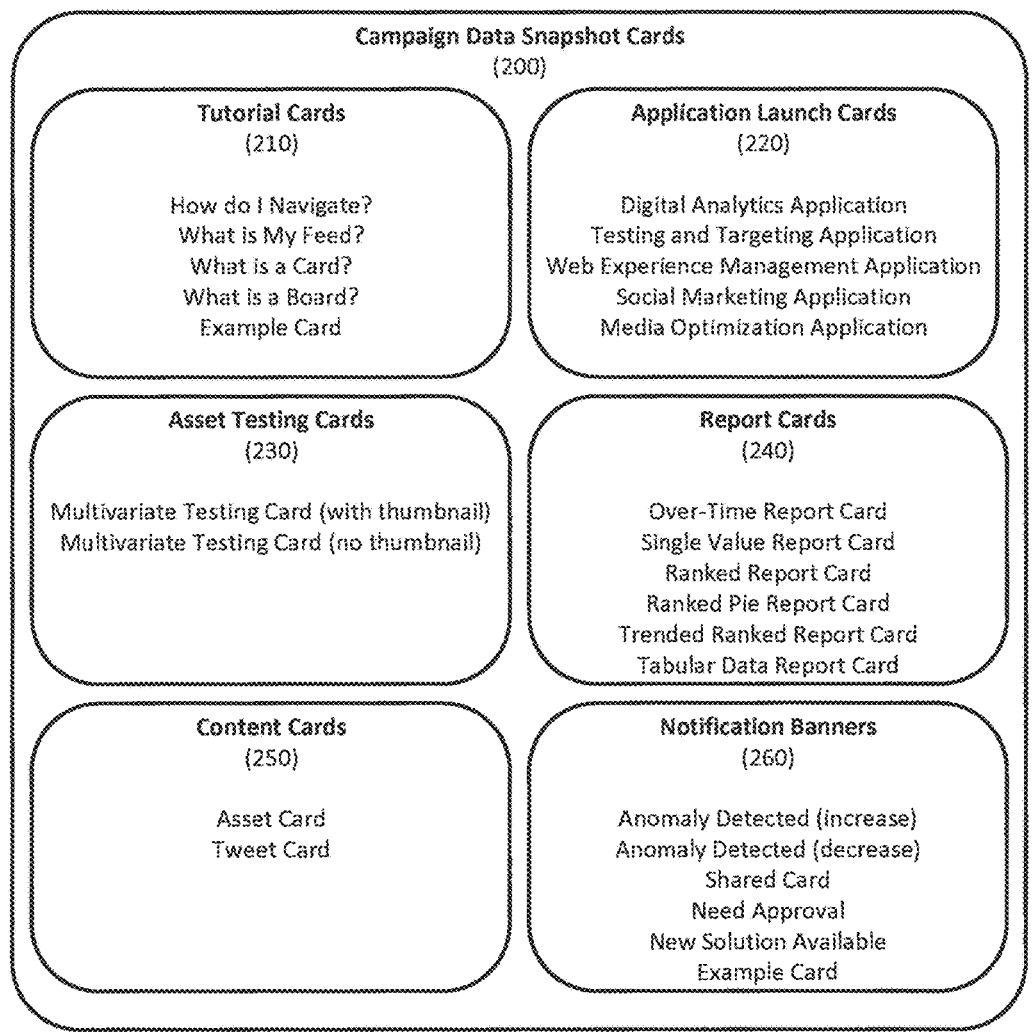
FIG. 4 is a block diagram schematically illustrating an example categorization of campaign data snapshot cards in accordance with an embodiment of the present invention.

The campaign data snapshot cards described herein can be used for a variety of purposes, such as to present data generated by the campaign applications, provide access to the functionality of the campaign applications, and display information relating to the operation of the campaign manager platform 100. Thus, a particular card can be categorized based on the underlying purpose of the card and/or the functionality of the card. A particular card can also be classified as containing static data or dynamic data. Static data includes data that generally does not change over time, or that changes infrequently. For example, cards containing tutorial information or application launch shortcuts can be considered as containing static data. Dynamic data includes campaign data that tends to change with the passing of time. For example, cards reporting statistics relating to the status of a campaign or cards displaying social media assets can be considered as containing dynamic data. FIG. 4 is a block diagram schematically illustrating an example categorization of a group of campaign data snapshot cards 200 in accordance with an embodiment of the present invention. As illustrated in FIG. 4, certain cards may optionally include a notification banner 260 configured to call special attention to such cards, as will be discussed in turn. It will be appreciated that other cards and/or card categorizations may be included in other embodiments, and that the present invention is not intended to be limited to a particular set of campaign data snapshot cards or card categorizations.

As illustrated in FIG. 4, the cards 200 include a plurality of tutorial cards 210 that display information relating to the operation of the campaign manager platform 100. Tutorial cards 210 can be considered as containing static data. FIG. 5A is a collection of screenshots illustrating the example tutorial cards 210 of FIG. 4, which include a "How do I Navigate?" card 211, a "What is My Feed?" card 212, a "What is a Card?" card 214 and a "What is a Board?" card 215. The tutorial cards 210 also optionally include an example card 216. Other tutorial cards may additionally or alternatively be included in other embodiments. The tutorial cards 210 provide the user with a short synopsis relating to the operation of the campaign manager platform 100 and its user interface, and may be particularly helpful for a new user. In such embodiments clicking, tapping or otherwise selecting one of the tutorial cards 210 causes an expanded overlay state of the selected card to be displayed. The expanded overlay state of a tutorial card 210 optionally includes hyperlinks, interactive demonstrations and/or other dynamic content that allows the user to access additional, more detailed information regarding a selected aspect of the campaign manager platform 100.

Figure 5B:
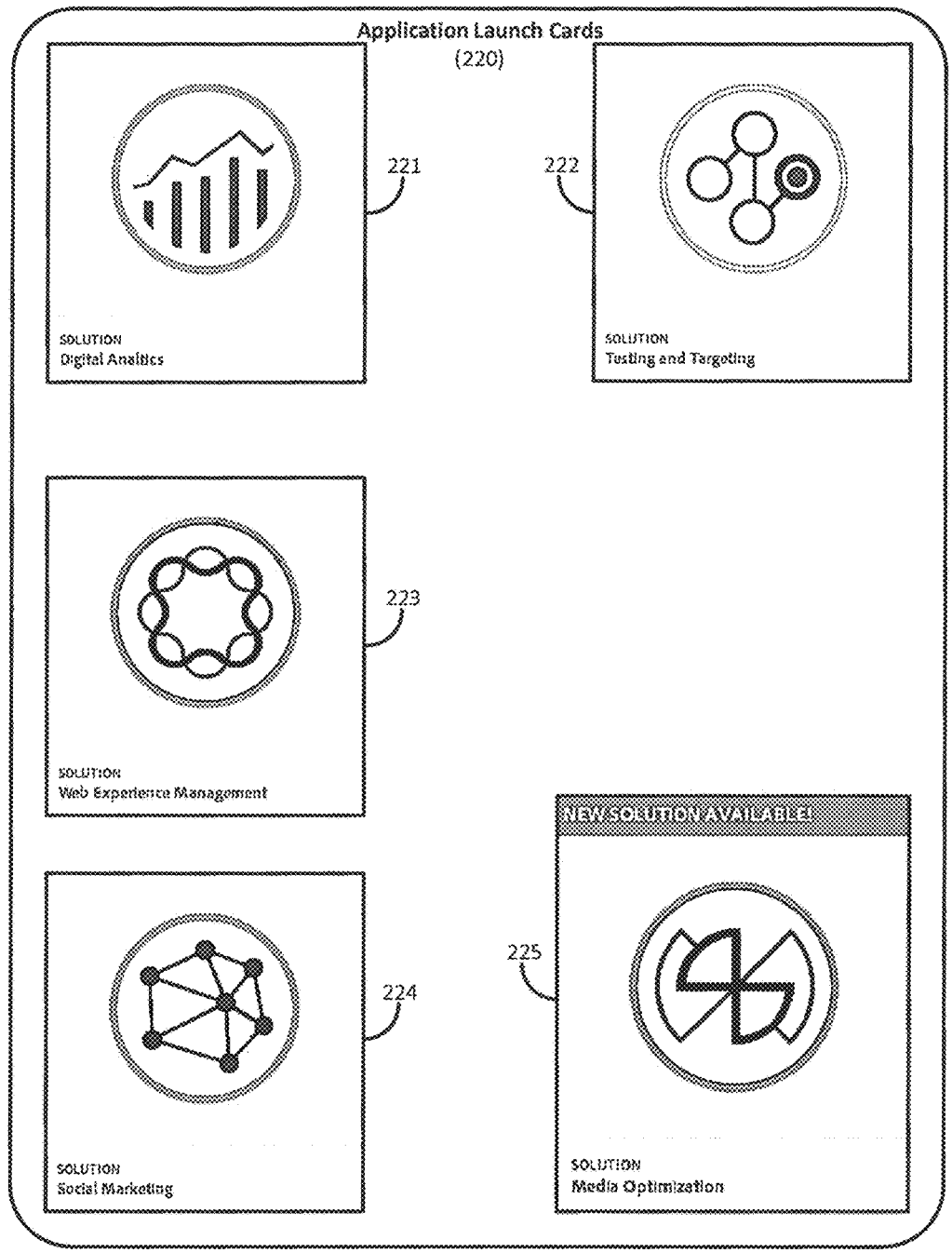
FIG. 5B is a collection of screenshots illustrating the example application launch cards of FIG. 4.

Certain of the campaign data snapshot cards 200 can be used to provide access to the campaign applications. FIG. 5B is a collection of screenshots illustrating the example application launch cards 220 of FIG. 4, which include a digital analytics application launch card 221, a testing and targeting application launch card 222, a web experience management application launch card 223, a social marketing application launch card 224 and a media optimization application launch card 225. Other application launch cards may additionally or alternatively be included in other embodiments. The application launch cards 220 can be considered as containing static data, and provide the user with an easy way to access the functionality of the campaign applications. In such embodiments clicking, tapping or otherwise selecting one of the application launch cards 220 causes an expanded overlay state of the selected card to be displayed. The expanded overlay state of an application launch card 220 optionally includes additional functionality beyond launching the campaign application, such as the ability to access application support, the ability to share access to the selected application with another campaign member, and/or the ability to send comments to other campaign members. In embodiments where a campaign member's security credentials are stored in user data repository 190, accessing a campaign application via the application launch cards 220 can automatically cause the security credentials to be retrieved from the user data repository 190 and submitted to the campaign application, thereby providing a more seamless transition from the campaign manager platform 100 to the campaign application.

Still referring to FIG. 4, the campaign data snapshot cards 200 include a plurality of asset testing cards 230 that can provide information regarding an asset testing campaign. Asset testing cards 230 can be considered as containing dynamic data. FIG. 5C is a collection of screenshots illustrating the example asset testing cards 230 of FIG. 4, which include a multivariate testing card with thumbnails 231, and a multivariate testing card without thumbnails 232. Other asset testing cards may additionally or alternatively be included in other embodiments. Such cards allow the user to monitor the progress and/or results of a multivariate testing campaign through which the efficacy of various online assets are evaluated. For example, in one such test five different images of sneakers are evaluated to determine which image results in the highest sales conversion rate. In this case, the user is able to quickly understand which of the images is most effective in converting sales. More generally, the asset testing cards 230 provide easy-to-understand information regarding which of a plurality of tested web experiences is most effective in achieving a predefined result. In certain embodiments clicking, tapping or otherwise selecting one of the asset testing cards 230 causes an expanded overlay state of the selected card to be displayed. The expanded overlay state of an asset testing card 230 optionally provides more detailed information regarding the selected asset testing campaign, and may provide additional functionalities which will be discussed in turn.

Figure 5D:
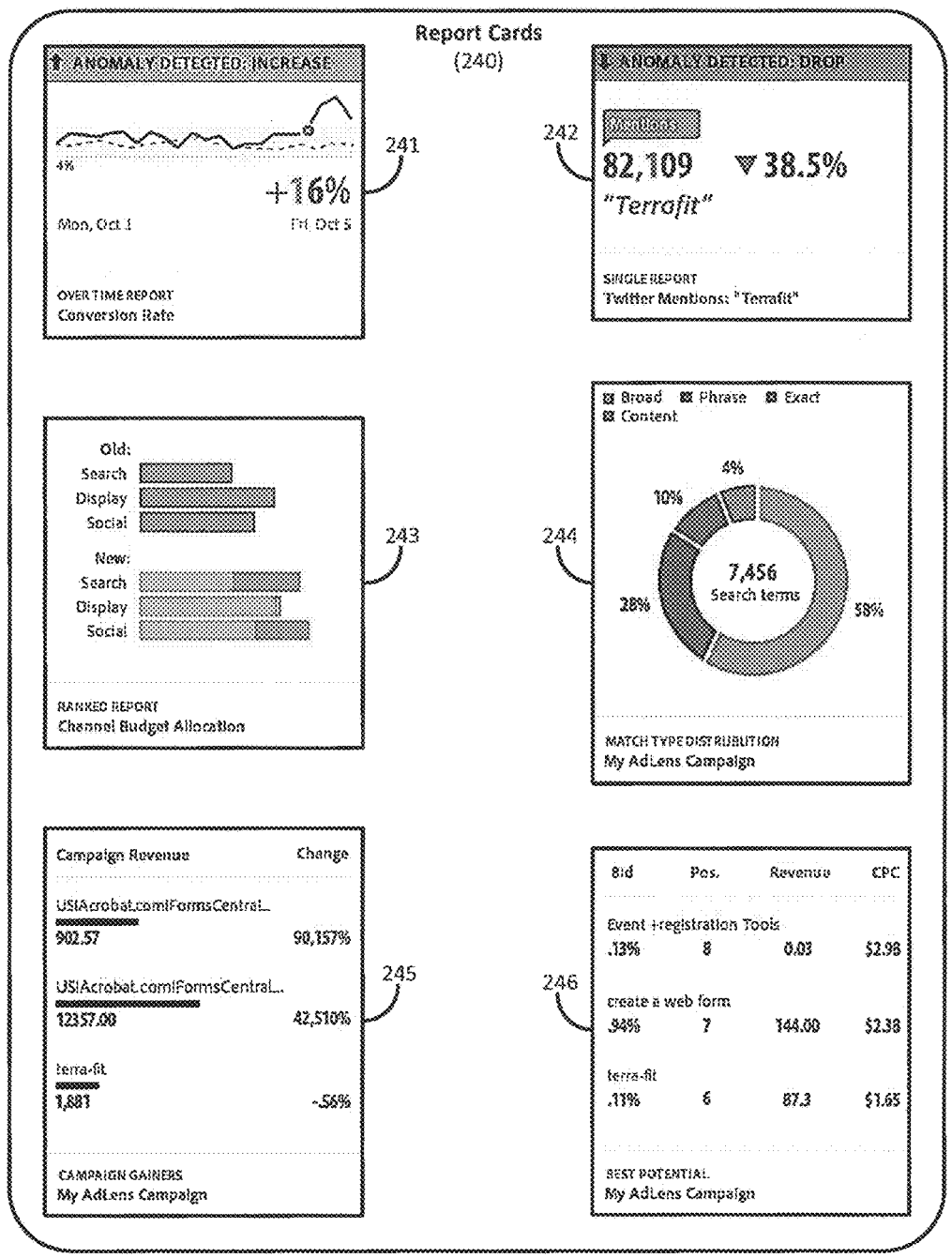
FIG. 5D is a collection of screenshots illustrating the example report cards of FIG. 4.

In certain embodiments, the campaign data snapshot cards 200 also include a plurality of report cards 240 that can provide a wide range of analytical data relating to the campaign. Report cards 240 can be considered as containing dynamic data. FIG. 5D is a collection of screenshots illustrating the example report cards 240 of FIG. 4, which include an over-time report card 241, a single value report card 242, a ranked report card 243, a ranked pie report card 244, a trended ranked report card 245 and a tabular data report card 246. Other report cards may additionally or alternatively be included in other embodiments. Such cards allow the user to monitor the progress and efficacy of the campaign through a wide variety of metrics. An over-time report card 241 can be used, for example, to understand how the sales conversion rate for a particular page changes as a function of time. A single value report card 242 can be used, for example, to provide a count of how many webpage hits, Twitter mentions, or Facebook posts relating to a particular product line are detected. A ranked report card 243, a ranked pie report card 244 and/or a trended ranked report card 245 can be used, for example, to provide a ranking of how campaign resources are allocated across available communication channels or how revenue is generated. A tabular data report card 246 can be used, for example, to present any suitable campaign data in a tabular format. In certain embodiments clicking, tapping or otherwise selecting one of the report cards 240 causes an expanded overlay state of the selected card to be displayed. The expanded overlay state of a report card 240 optionally provides more detailed information regarding the selected report, and may provide additional functionalities with respect to that report, as will be discussed in turn.

Figure 5E:
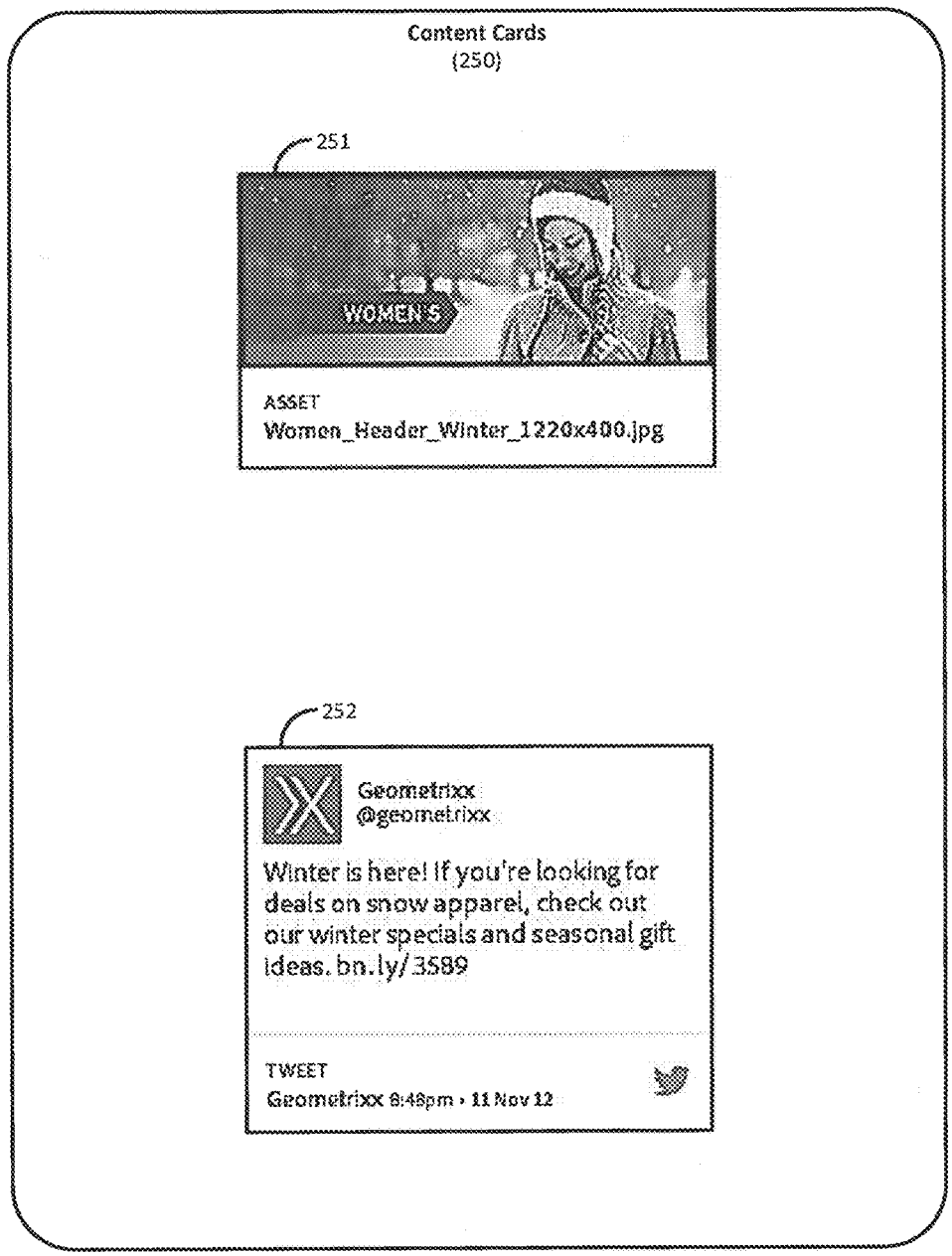
FIG. 5E is a collection of screenshots illustrating the example content cards of FIG. 4.

As illustrated in FIG. 4, the cards 200 include a plurality of content cards 250 that display selected content used in the campaign. Content cards 250 can be considered as containing dynamic data. FIG. 5E is a collection of screenshots illustrating the example content cards 250 of FIG. 4, which include an asset card 251 and a tweet card 252. Other content cards may additionally or alternatively be included in other embodiments. Such cards allow the user to quickly see media assets such as photographs, videos and social media posts which are being used in the campaign. In certain embodiments clicking, tapping or otherwise selecting one of the content cards 250 causes an expanded overlay state of the selected card to be displayed. The expanded overlay state of a content card 250 optionally provides more detailed information regarding the selected content, and provides additional functionalities with respect to that content, as will be discussed in turn.

A notification banner 260 is optionally added to certain of the campaign data snapshot cards 200. A notification banner 260 is an annotation that is added to the card and that is configured to draw attention to the card and/or provide the user with brief message. Example messages that can be provided via a notification banner 260 are illustrated in FIG. 4. For instance, the example card 216 illustrated in FIG. 5A includes a notification banner indicating "Example Card" to draw the user's attention to the fact that the card 216 is not presenting actual data. As another example, the media optimization application launch card 225 illustrated in FIG. 5B includes a notification banner indicating "New Solution Available" to draw the user's attention to the fact that the media optimization application launch card 225 was recently added. As yet another example, the over-time report card 241 and the single value report card 242 illustrated in FIG. 5D include notification banners indicating "Anomaly Detected: Increase" and "Anomaly Detected: Drop", respectively. Such notification banners are configured to draw the user's attention to the fact that the campaign manager platform 100 has detected a data anomaly that may be of interest to the user. Other notification banners may additionally or alternatively be used in other embodiments, such as notification banners indicating that a new card has been added to a feed or board, or indicating that a user response is requested. A notification banner can be configured to expire and disappear after a predetermined amount of time, persist until dismissed by a user, or persist until the condition that triggered the banner ends.

Figure 6:
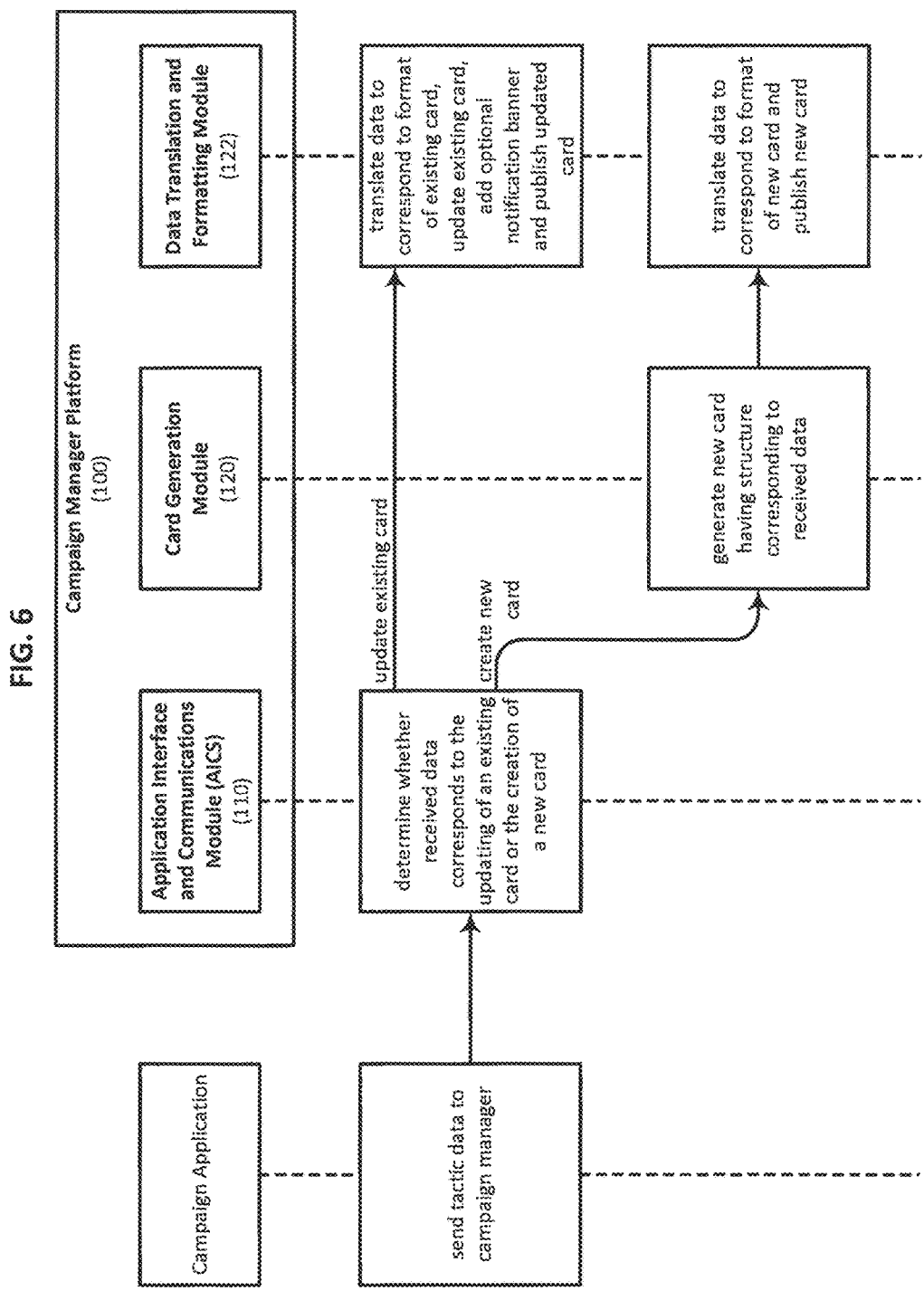
FIG. 6 illustrates a methodology for generating a campaign data snapshot card containing dynamic data in accordance with an embodiment of the present invention.

FIG. 6 illustrates a methodology for generating a campaign data snapshot card containing dynamic data in accordance with an embodiment of the present invention. For instance, such a methodology can be used to generate one of the asset testing cards 230, report cards 240 and/or content cards 250. As can be seen, this example methodology includes a number of phases and sub-processes, the sequence of which may vary from one embodiment to the next. However, when considered in the aggregate, these phases and sub-processes form a complete campaign data snapshot card generation function that can be used in the context of a coordinated campaign such as on online marketing campaign. This methodology and its variants can be implemented, for example, using the system architecture illustrated in FIGS. 2 and 3 and described above, although other systems and architectures can be used in other embodiments. To this end, the correlation of the various functions shown in FIG. 6 to specific users, systems or modules shown in FIGS. 2 and 3 is not intended to imply any structural and/or use limitations. Rather, other embodiments may include, for example, varying degrees of integration where multiple functionalities are effectively performed by one user, system and/or module, such as where the card generation module 120 and the data translation and formatting module 122 are integrated into a single module. Thus, other embodiments may have fewer or more users, systems and/or modules depending on the granularity of implementation. Numerous variations and alternative configurations will be apparent in light of this disclosure.

As illustrated in FIG. 6, the method commences when a campaign application generates campaign tactic data and sends such data to the campaign manager platform 100. Examples of campaign tactic data include website traffic data generated by the digital analytics application 10, testing results generated by the testing and targeting application 20, asset data generated by the web experience management application 30, or social network post data generated by the social marketing application 40. Such data can be sent to the campaign manager platform 100 in response to a user request, in response to a certain data condition or anomaly being detected, or periodically according to a predefined schedule. When the campaign tactic data is received by the campaign manager platform 100, the AICM 110 determines whether the received data corresponds to the updating of an existing card or the creation of a new card. Such a determination can be performed, for example, by consulting an index of previously generated cards saved in published card data repository 192.

In certain embodiments, where the AICM 110 determines that the received data corresponds to the updating of an existing card, the received data is provided to the data translation and formatting module 122. The data translation and formatting module translates the received data to correspond to the format of the existing card and updates the existing card. An anomaly detection algorithm is optionally performed, for example using an anomaly detection sub-module, in which case a notification banner can be added to the updated card in the event an anomaly in the updated data is detected. For example, a notification banner can be used to draw attention to an unexpected or unusual change in the data indicated in the snapshot card. After the existing card is updated and any suitable notification banner is added, the updated card can be published. In one embodiment publication of the updated card comprises indexing the updated card in the published card data repository and making the published card available to other modules that comprise the campaign manager platform 100. For example, in one embodiment the updated card is provided to the UICM 115, which can in turn transmit the updated card to one or more campaign members.

However, in embodiments where the AICM 110 determines that the received data corresponds to the creation of a new card, the received data is provided to the card generation module 120. The card generation module 120 generates a new campaign data snapshot card having an appropriate structure that corresponds to the received data. For example, where the received data is a new Twitter tweet, a tweet card 252 can be generated. In certain embodiments multiple card formats may be appropriate for the received data, in which case multiple cards can be generated. For example, where the received data represents the results of a multivariate testing campaign, both a multivariate testing card with thumbnails 231 and a multivariate testing card without thumbnails 232 can be generated. After the appropriate card or cards are generated by the card generation module 120, such new cards can be provided to the data translation and formatting module 122 which translates the received data to correspond to the format of the new cards. The new cards can then be published, for example, by indexing the new cards in the published card data repository and making the published cards available to other modules that comprise the campaign manager platform 100. Thus the data translation and formatting module 122 is also referred to herein as a publishing module.

As described above, the campaign data snapshot cards 200 can be used for a variety of purposes, such as to present data generated by the campaign applications, provide access to the functionality of the campaign applications, and display information relating to the operation of the campaign manager platform 100. Cards containing dynamically updated data metrics are related to various campaign tactics, such as the channels via which the campaign communicates, the specific content or information that the campaign distributes, and the methodologies which the campaign uses to distribute its content. The campaign data snapshot cards 200 optionally have a modular appearance with a similar shape, thus facilitating their incorporation into feeds and boards as described herein. This helps simplify and demystify an otherwise complex campaign by presenting complicated information in a way that makes it understandable, even for campaign members who may not be experts in certain aspects of the domain. The campaign data snapshot cards 200 are scalable in the sense that a wide range of campaign applications can be tethered to the campaign manager platform 100 and can supply data that is presented via such cards.

Card Feeds and Card Boards

As described above, the campaign data snapshot cards 200 can be organized into a customized feed that is dynamically updated according to a relevancy algorithm that depends on factors such as the feed owner's role in the overall campaign, the data contained in a particular card, and the aging of such data. For example, in one embodiment the relevancy of the cards included within the feed is determined by one or more factors selected from the group consisting of the aging of the data presented on the card (as measured from the time of the most recent update); the aging of the card itself (as measured from the time the card was created); the aging of the card within the feed (as measured from the time the card was added to the user's feed); the number of comments and/or annotations associated with the card; the number of times a user has viewed a particular card; the number of campaign member feeds and/or boards in which the card appears; the other applications used by the feed owner, also referred to herein as the feed owner's "observed interaction history" or "interaction history"; the role of the feed owner in the overall campaign; and a user-configurable relevancy ranking. In embodiments wherein the relevancy algorithm considers multiple factors in determining the card relevancy, each of the multiple factors can be assigned a weight, such that, for example, the aging of the data on the card is a stronger factor than the number of comments associated with a particular card. The weight assigned to a particular factor can be user-configurable, hard-coded or otherwise provisioned by default.

A campaign member can curate a subset of the cards contained within his/her feed into a board that can be shared with other campaign members. Thus, while the feed can provide an automatically updated list of relevant campaign tactics for a particular campaign member, a board can be shared by a group of campaign members, and can be configured to change only when new cards are added or removed by those sharing the board, or when the data presented in the cards changes. Regardless of whether they appear in a board or a feed, cards containing dynamic data, such as asset testing cards 230, report cards 240 and content cards 250, can be updated in response to a user request, in response to a certain data condition or anomaly being detected, or periodically according to a predefined schedule. Thus, even if the cards contained within a feed or board do not change, the appearance of the feed or board may still vary as the data contained within the cards is updated periodically.

Figure 7:
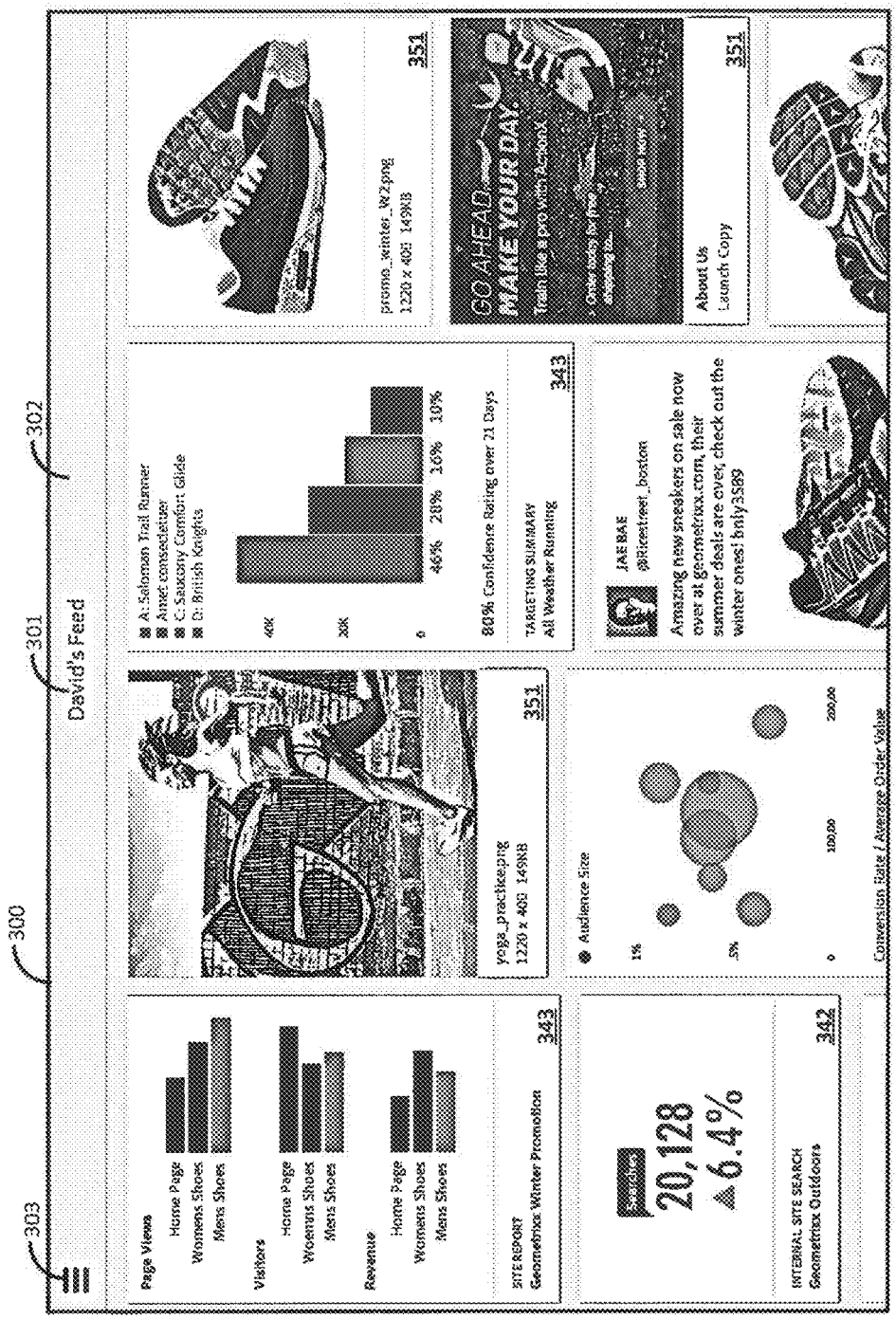
FIG. 7 is a screenshot illustrating the appearance of an example campaign card feed that is configured in accordance with an embodiment of the present invention.

FIG. 7 is a screenshot illustrating the appearance of an example campaign feed 300 that is configured in accordance with an embodiment of the present invention. The feed 300 includes a plurality of campaign data snapshot cards, such as one or more ranked report cards 343, multiple asset cards 351 and single value report cards 342. Additional or alternative cards may be included in other embodiments, and it will be appreciated that the present invention is not intended to be limited to a particular set of cards appearing in the feed 300. The name of the feed owner 301 is optionally provided in a title bar 302. Where the number of cards included in the feed 300 is greater than that which can reasonably be displayed on one screen, additional cards can be viewed using any suitable scrolling control, such as a swiping gesture made on a touchscreen, a keyboard-based scrolling command, or a pointer-based scroll bar that is displayed with the feed. A menu icon 303 can be included to provide access to other functionalities of the campaign manager platform 100, for example via a sidebar, a popup menu or the like.

There are several ways in which a card can be added to a user's feed. In one embodiment, cards generated by a certain campaign application that a user works with are automatically added to that user's feed. For example, team member TM-a, illustrated in FIGS. 1 and 2, is a member of the data analytics team and works with the digital analytics application 10. Thus, in certain embodiments, cards generated based on data received from the digital analytics application 10 are automatically added to team member TM-a's feed. In other embodiments, the campaign member can elect to include in his/her feed to all cards or selected cards generated by multiple campaign applications, including applications with which the campaign member may not directly work. In still other embodiments, cards can be added to a campaign member's feed in response to a certain data condition or anomaly being detected. In still other embodiments a campaign member can share a card of interest with his/her colleagues, such that the shared cards are automatically added to the recipient's feed. Campaign cards can also be added to a user's feed based on the occurrence of a plurality of such conditions. It will be appreciated that other techniques for adding cards to a user's feed can be implemented in other embodiments, and that the present invention is not intended to be limited to any such method or implementation.

In certain embodiments the position, organization and/or appearance of the snapshot cards in the feed 300 is determined by a relevancy algorithm that is applied using the feed relevancy determination module 142 illustrated in FIG. 3. The relevancy algorithm can be applied such that cards having greater relevancy to a user, or having a greater predicted relevancy, are presented more prominently within the feed. The relevancy algorithm can be applied, for example, after the data translation and formatting module 122 publishes a new card or updates an existing card. The relevancy algorithm can additionally or alternatively be applied at predetermined time intervals, particularly in embodiments wherein the aging of a card may cause a change in relevancy without regard to updates to the data presented in the cards.

For example, a more prominent presentation may comprise positioning the card near the top row and/or left column of the feed. A more prominent presentation may additionally or alternatively include highlighting the card, adding a specific icon to the card, providing the card with a distinctive color and/or adding a notification banner to the card, such as one or more of the notification banners 260 illustrated in FIG. 4. In one embodiment the relevancy of the cards included within the feed is determined by one or more factors selected from the group consisting of the aging of the data presented on the card (as measured from the time of the most recent update); the aging of the card itself (as measured from the time the card was created); the aging of the card within the feed (as measured from the time the card was added to the user's feed); the number of comments and/or annotations associated with the card; the number of times a user has viewed a particular card; the number of campaign member feeds and/or boards in which the card appears; the feed owner's observed interaction history; the role of the feed owner in the overall campaign; and a user-configurable relevancy ranking. In embodiments wherein the relevancy algorithm considers multiple factors in determining the card relevancy, each of the multiple factors can be assigned a weight, such that, for example, the aging of the data on the card is a stronger factor than the number of comments associated with a particular card. The weight assigned to a particular factor can be user-configurable, hard-coded or otherwise provisioned by default.

Figure 8:
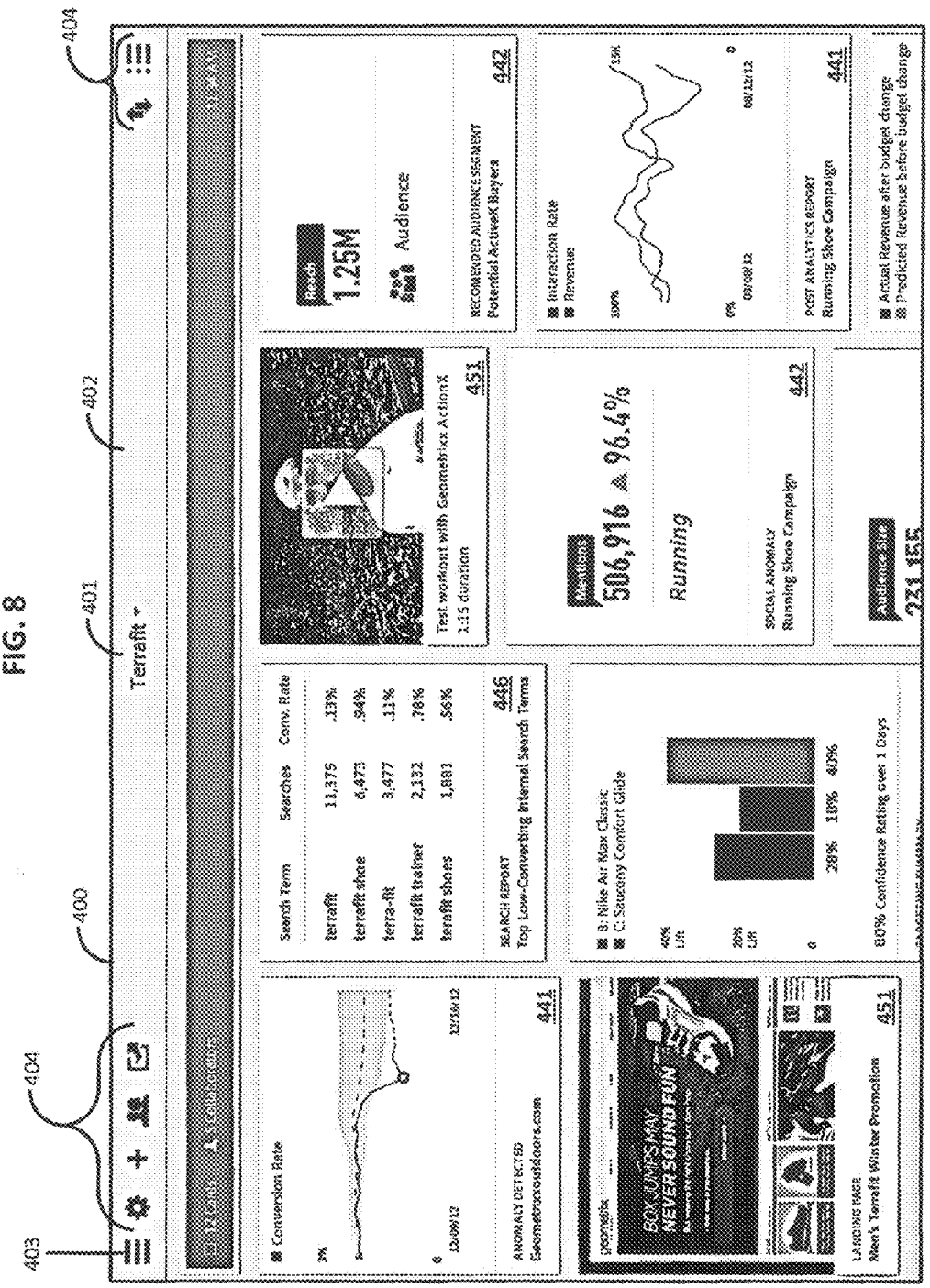
FIG. 8 is a screenshot illustrating the appearance of an example campaign card board that is configured in accordance with an embodiment of the present invention.

As described above, a campaign member can curate a subset of the cards contained within his/her feed into a board that can be shared with other campaign members. Thus, while the feed provides a grouping of cards that is customized for and presented to an individual campaign member, a board provides a grouping of cards that is curated by, and customized for, a plurality of campaign members. This plurality of campaign members may include members from the different teams that comprise the overall campaign. A board can be created, for example, to facilitate collaborative study of the efficacy of a new campaign tactic, to discuss a detected anomaly, and/or to review new assets that are being prepared for launch. FIG. 8 is a screenshot illustrating the appearance of an example campaign card board 400 that is configured in accordance with an embodiment of the present invention.

Referring now to FIG. 8, the board 400 includes a plurality of campaign data snapshot cards, such as one or more over-time report cards 441, tabular data report cards 446, asset cards 451 and single value report cards 442. Additional or alternative cards may be included in other embodiments, and it will be appreciated that the present invention is not intended to be limited to a particular set of cards appearing on the board 400. The name of the board 401 is optionally provided in a title bar 402. Where the number of cards included in the board 400 is greater than that which can reasonably be displayed on one screen, additional cards can be viewed using any suitable scrolling control, such as a swiping gesture made on a touchscreen, a keyboard-based scrolling command, or a pointer-based scroll bar that is displayed with the feed. A menu icon 403 can be included to provide access to other functionalities of the campaign manager platform 100, for example via a sidebar, a popup menu or the like. Additionally or alternatively, one or more menu bar shortcut icons 404 can be used to access frequently-used functionalities, such as the ability to adjust configuration settings, the ability to add additional cards to the board 400, the ability to invite other campaign members to the board 400, and the ability to export one or more cards from the board to a presentation format.

In certain embodiments the identification and organization of the cards included in board 400 is managed by the user board configuration module 142 illustrated in FIG. 3. Such organization can be configurable by a creator of the board, configurable by any campaign member with access to the board, or can be provisioned by a default (such as by placing the newest cards closest to an upper-left corner of the board). The user board configuration module 142 can be adapted to monitor, and optionally control, the identification and organization of the various cards that comprise the board 400. Data defining the cards that comprise the board 400 and their organization can be saved in user data repository 190. This arrangement enables all users with access to a selected board 400 to be presented with a uniform group of campaign cards having the same organization. However, in other embodiments each user with access to a particular board can customize how the board is presented, in which case data defining such customizations can also be stored in user data repository 190, thereby allowing the user to access his/her customizations without regard to the particular computing device that is used to access the campaign manager platform 100.

Figure 9:
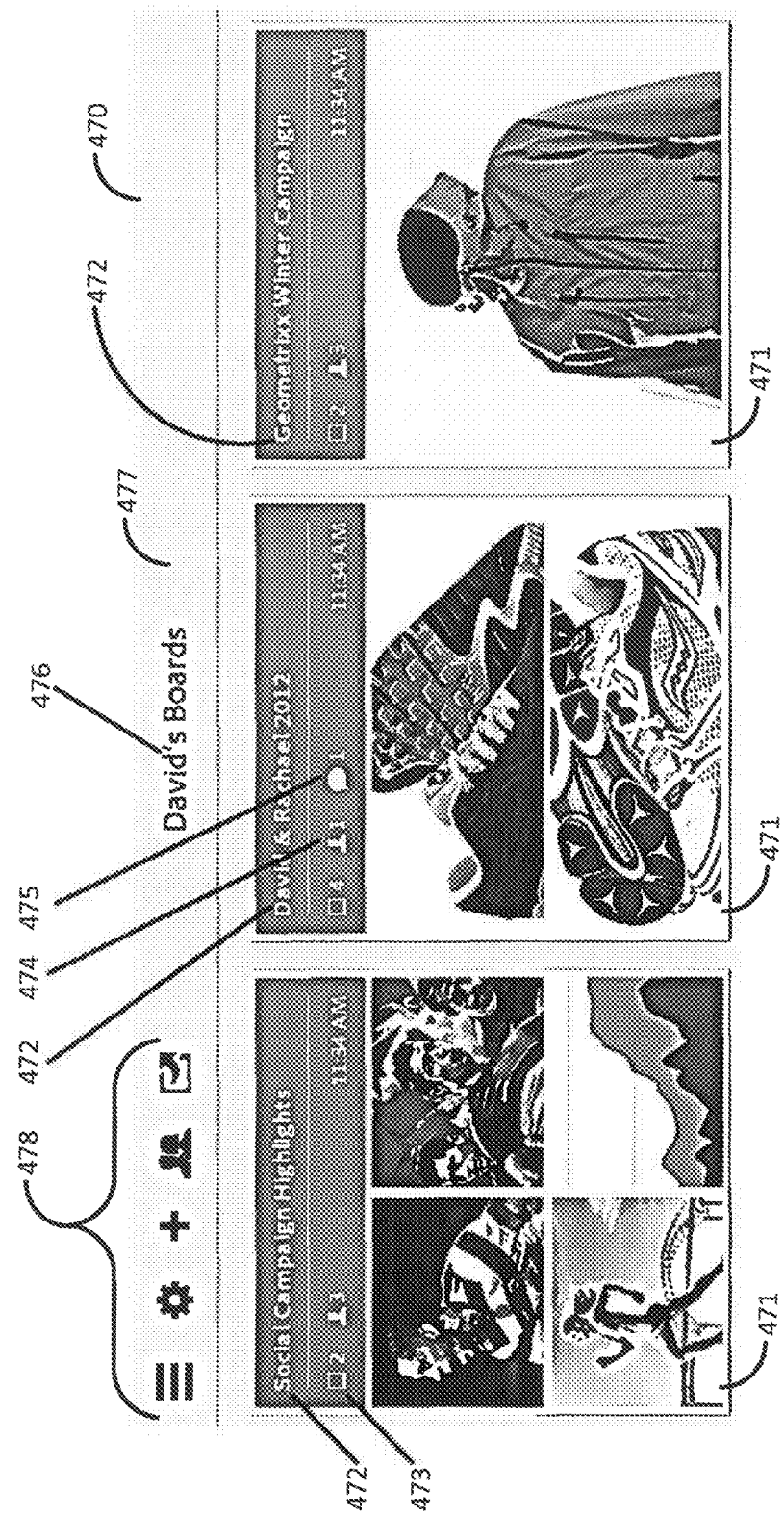
FIG. 9 is a screenshot illustrating an example board selection user interface configured in accordance with an embodiment of the present invention.

A campaign member may have access to multiple boards. Thus, in such embodiments the user board configuration module 142 is further adapted to generate an index of boards to which a user has access. Such an index can be provided via a board selection user interface that is accessed through the menu icon 403 illustrated in FIG. 8. FIG. 9 is a screenshot illustrating an example board selection user interface 470 configured in accordance with an embodiment of the present invention. The board selection user interface 470 includes a plurality of board summarization cards 471 that include the board name 472 and other summary information such as the number of cards 473 included in the board, the number of collaborators 474 with access to the board, and the number of comments and/or annotations 475 posted to the board. Additional or alternative summary information may be provided in other embodiments. The name of the user 476 having access to such boards is optionally provided in a title bar 477. Where the number of boards included in the index is greater than that which can reasonably be displayed on one screen, additional board summarization cards can be viewed using any suitable scrolling control, such as a swiping gesture made on a touchscreen, a keyboard-based scrolling command, or a pointer-based scroll bar that is displayed with the index. Additionally or alternatively, one or more menu bar shortcut icons 478 can be used to access frequently-used functionalities, such as the ability to adjust configuration settings, the ability to add additional boards to the index, the ability to invite other campaign members to a selected board, and the ability to export the cards associated with a selected board to a presentation format. The boards listed in the board selection user interface 470 can be viewed by clicking, tapping or otherwise selecting one of the board summarization cards.

There are several ways in which a card can be added or "pinned" to a board. For example, in one embodiment a feed owner curates cards from his/her feed and pins such cards to existing boards or new boards. FIG. 10A illustrates a methodology 500 for curating cards from a feed to new or existing boards in accordance with an embodiment of the present invention. As can be seen, this example methodology includes a number of phases and sub-processes, the sequence of which may vary from one embodiment to the next. However, when considered in the aggregate, these phases and sub-processes from a complete methodology for curating cards from a feed to new or existing boards. This methodology can be implemented, for example, using the user board configuration module 142 illustrated in FIG. 3 and described above, although other modules, systems and architectures can be used in other embodiments. To this end, the correlation of the various functions shown in FIG. 100A to specific modules shown in FIG. 3 is not intended to imply any structural and/or use limitations. Numerous variations and alternative configurations will be apparent in light of this disclosure.

As illustrated in FIG. 10A, the method commences when a feed owner views 502 cards displayed in his/her feed. Upon identifying a card of interest, the feed owner selects 504 the card of interest by clicking, tapping or using any other appropriate selection technique. In one embodiment, selecting the card causes the card to be highlighted and additional icons to be displayed over the highlighted card. Such icons can be used to access additional functionality such as removing a card from the feed or pinning the card to a board. See reference numeral 510 in FIG. 10A. In this circumstance, selecting an icon corresponding to the card removal functionality removes 515 the selected card from the feed.

On the other hand, selecting an icon corresponding to a card pinning functionality further allows the feed owner to decide 520 whether to pin the selected card to a new board or an existing board. The feed owner can pin the card to an existing board by selecting 525 an existing board from a list of available boards. However, selecting an icon corresponding to a new board enables the feed owner to define 530 a name for the new board, invite 532 other campaign members to the new board, and set 534 permissions for new invitees. Examples of such permissions include, but are not limited to viewing permission, commenting and/or annotation permission, and board modification permission. The methodology illustrated in FIG. 10A advantageously allows a feed owner to curate cards from his/her feed into new or existing boards, and thereby share insights revealed in his/her feed with other campaign members.

Figure 10B:
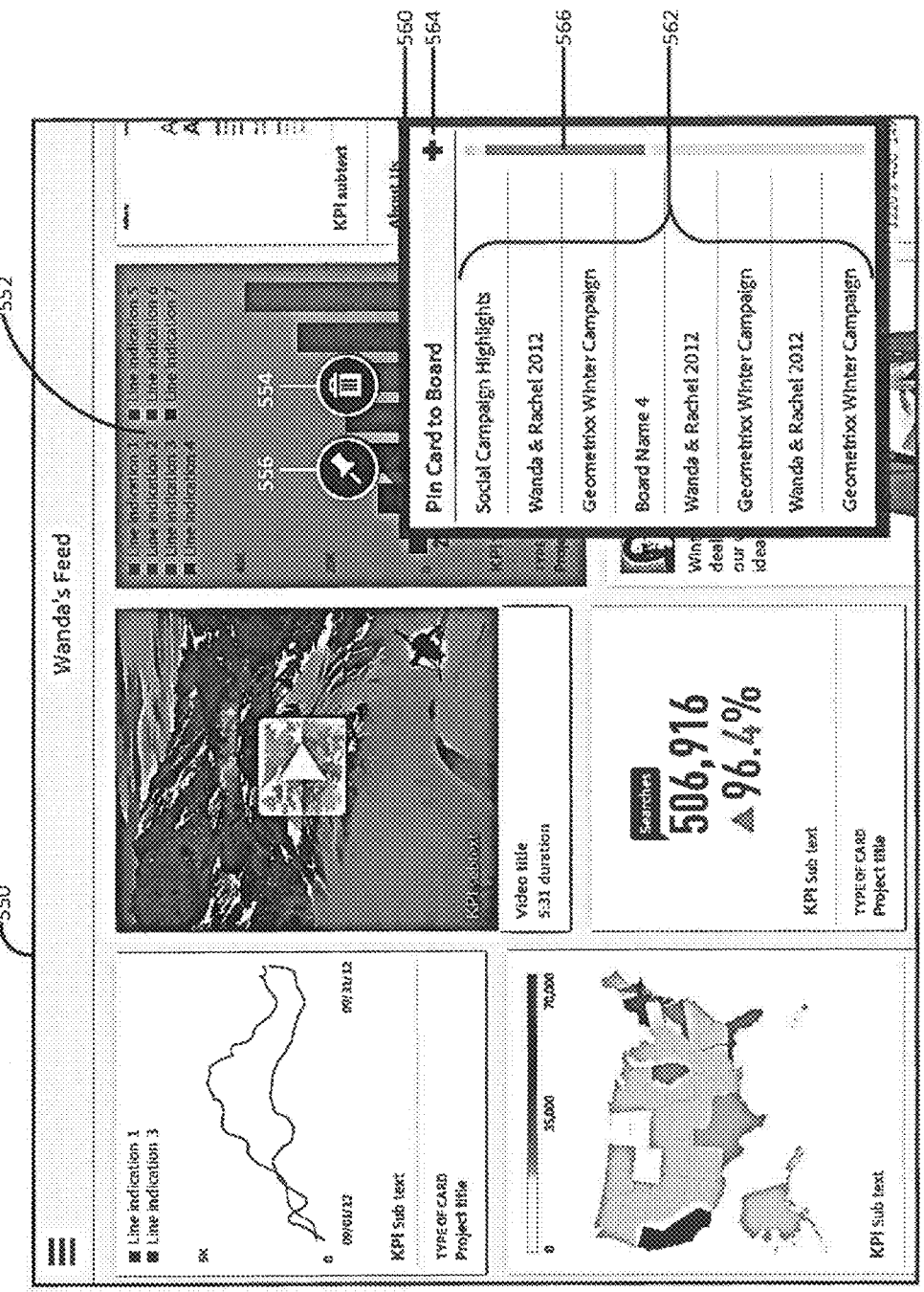
FIG. 10B is a screenshot illustrating the appearance of contextual icon functionality that can be used to manipulate cards within a feed in accordance with an embodiment of the present invention.

The methodology illustrated in FIG. 10A can be implemented, for example using a user interface such as that illustrated in FIG. 10B. FIG. 10B is a screenshot illustrating the appearance of contextual icon functionality that can be used to manipulate cards within a feed in accordance with an embodiment of the present invention. Specifically, FIG. 10B illustrates a feed 550 wherein the feed owner has selected a certain card 552 by clicking, tapping or using any other appropriate selection technique. The card 552 is indicated as being selected by being highlighted, although other selection indicia can be used in other embodiments. Selecting the card 552 causes additional icons to be displayed over the highlighted card, such as removal icon 554 and pinning icon 556. As noted above, selecting the removal icon 554 causes the card to be removed from the feed, optionally after such command has been confirmed by the feed owner. On the other hand, selecting the pinning icon 556 causes a contextual menu 560 to be displayed. The contextual menu 560 includes a listing 562 of available boards, as well as a board creation icon 564. Where the listing 562 of available boards is larger than can be accommodated by the contextual menu, a scroll bar 566 can be provided to facilitate viewing of all available boards. In such embodiments selecting the board creation icon 564 causes additional dialogue boxes to be displayed that allow the feed owner to define the name of the new board, invite other campaign members to the new board, and set permissions for the invitees, as described above with respect to FIG. 10A. Such a user interface advantageously allows the user to either pin the selected card to a new board or pin the selected card to an existing board chosen from a listing 562 of available existing boards.

As described above, the campaign manager platform 100 is also optionally capable of exporting the cards contained within feeds and/or boards into alternative formats that facilitate their sharing with stakeholders outside the campaign. For example, this functionality can be accessed using one of the menu bar shortcut icons 404 illustrated in FIG. 8. FIG. 11 illustrates a methodology 570 for exporting cards from a feed or board to external formats in accordance with an embodiment of the present invention. As can be seen, this example methodology includes a number of phases and sub-processes, the sequence of which may vary from one embodiment to the next. However, when considered in the aggregate, these phases and sub-processes from a complete card exportation methodology. This methodology can be implemented, for example, using the card export module 144 illustrated in FIG. 3 to convert the cards to an alternative format and export the cards to an external file or application. However, other modules, systems and architectures can be used in other embodiments. To this end, the correlation of the various functions shown in FIG. 11 to specific modules shown in FIG. 3 is not intended to imply any structural and/or use limitations. Numerous variations and alternative configurations will be apparent in light of this disclosure.

As illustrated in FIG. 11, the method commences when a user views 571 cards displayed in a feed or in a board. In some embodiments cards can be exported from a feed but not a board, in other embodiments cards can be exported from a board but not a feed, and in still other embodiments cards can be exported from both a feed and a board. The user selects 572 a card sharing shortcut icon, for example from a group of menu bar shortcut icons. A context menu can be provided prompting the user to choose 574 between exporting the cards to a presentation format, to an image format, or to an email application. Additional or alternative export formats can be offered in other embodiments. Example presentation formats include, but are not limited to Apple Keynote, Microsoft PowerPoint and Corel Presentations. Example image formats include the tagged image file format (TIFF), the graphics interchange format (GIF) and portable network graphics (PNG) format.

After the user selects the desired export format, the user can be presented with another context menu from which the user selects 576 which supplemental content, if any, should be exported with the cards. Examples of supplemental content include card annotations and card comments. Where the user selects to export the cards to a presentation file, an image file or another type of file, the user can be further presented with a dialogue box in which the user specifies 578p a location where the presentation file is to be saved, or specifies 578i a location where the image file is to be saved. Upon specifying a location where the presentation file is to be saved, the presentation file is saved 579p. Likewise, upon specifying a location where the image file is to be saved, the image file is saved 579i. Where the user selects to export the cards to email, the card export module 144 launches or otherwise accesses 579e an email application. In certain embodiments all the cards within a feed or board are exported by default, while in other embodiments the user may select particular cards for export.

Figure 12:
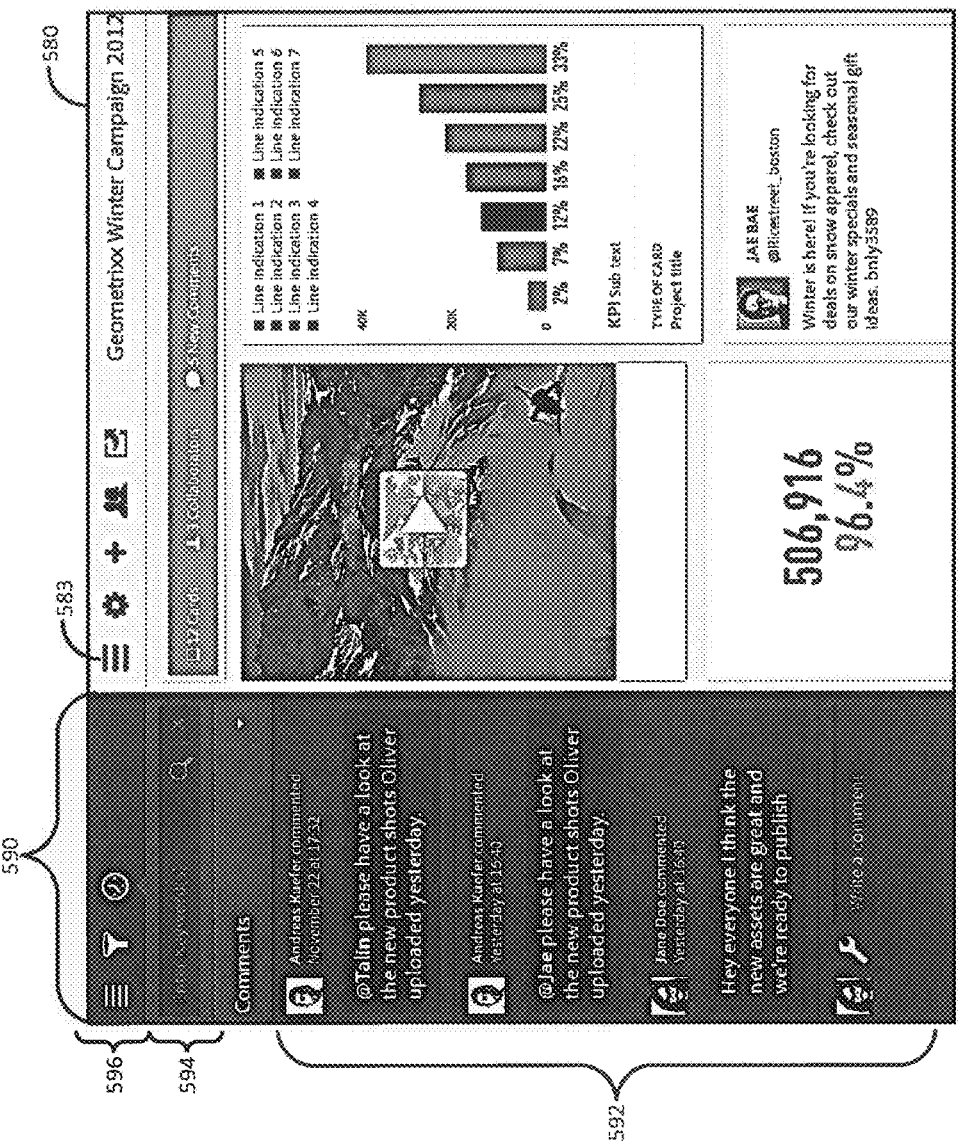
FIG. 12 is a screenshot illustrating an example comment forum configured in accordance with an embodiment of the present invention.

The campaign manager platfom 100 is also optionally capable of providing a comment forum with the boards disclosed herein. Such a comment forum allows campaign members with access to a particular board to discuss the cards included therein. FIG. 12 is a screenshot illustrating an example comment forum 590 configured in accordance with an embodiment of the present invention. Specifically, FIG. 12 illustrates a board 580 wherein a comments forum 590 has been expanded. The comments forum 590 can be expanded, for example, using menu icon 583. The comment forum 590 includes an interface 592 where campaign members can view comments made by others and write their own comments. In one embodiment, the comment forum 590 further includes a search tool 594 that provides searching functionality. The searching functionality can be used to locate words and/or phrases within the cards included in the board, within the posted comments, or within the card data and the comments. Other functionalities, such as filtering and sorting tools, can be accessed using comment forum shortcut icons 596. In such embodiments, the functionality of the comment forum 590 is provided by the messaging module 154 that forms part of the campaign manager platform 100. This advantageously allows campaign members who are connected to the campaign manager platform 100 to communicate with each other regarding the data snapshot cards provided in the board, even if such campaign members are not on the same team or do not have access to the same campaign applications.

The various functionalities of the campaign manager platform 100 described herein with respect to the card feeds and the card boards are supported by the various modules of the campaign manager platform 100 illustrated in FIG. 3. For example, the card generation module 120 and the data translation and formatting module 122 provide a card publication functionality as described herein with respect to FIG. 6. Once campaign data snapshot cards are published, metadata representing the published cards and their functionalities can be stored in published card data repository 192. At that point modules such as feed relevancy determination module 140 and user board configuration module 142 can access such metadata to assemble and provide the various functionalities described herein with respect to the feeds and boards. For example, the feed relevancy determination module 142 can respond to user input or preprogrammed instructions by extracting card metadata from the published card data repository 192 and incorporating a corresponding card into a user's feed. Likewise, the user board configuration module 142 can respond to user input by extracting card metadata from the published card data repository 192 and incorporating a corresponding card into a board. The UICM 115 can be used to transmit the feed and/or board information to the campaign member's computing device where it can be displayed. Information regarding the configuration and contents of the feeds and boards can be stored in the user data repository 190 so as to provide users with a uniform experience regardless of the particular computing device used to access the campaign manager platform 100. Other modules, such as the card export module 144 and the messaging module 154 can be invoked to provide other functionalities, such as card exportation functionality and comment forum functionality, respectively.

As described above, the card feeds and card boards provide campaign members with a collaborative environment where they can view campaign data snapshot cards relating to the various tactics of the underlying campaign. Campaign members can also curate a subset of cards of particular interest into a board that can be shared with other campaign members who may benefit from the insights that can be gleaned therefrom. This allows a large set of data generated by a diverse array of specialized campaign applications to be distilled into smaller subsets of more meaningful insights which can be discussed with other campaign members working on similar initiatives. Finally, by providing functionality to export campaign data snapshot cards to other formats, the insights gleaned from such cards can be shared with other stakeholders outside the collaborative ecosystem.

Expanded Overlay State

In certain embodiments one or more of the campaign data snapshot cards 200 disclosed herein are provided with an expanded overlay state that provides additional, context-specific functionality in a unified platform. The expanded overlay state allows campaign members to view a more detailed version of a selected snapshot card and access functionalities provided by the application that provided the data for the selected card. Thus, if a snapshot card is understood as containing a first dataset of campaign application data, the expanded overlay state can be understood as containing a second dataset of the campaign application data, wherein the second dataset relates to the first dataset, but contains additional and/or more detailed information. Stated alternatively, the first dataset can be seen as a summary of the second, more detailed dataset. The expanded overlay state can additionally or alternatively be configured to allow campaign members to collaborate and communicate with each other about the data presented in the card through textual comments and visual annotation tools. As with the campaign data snapshot cards, the detailed data presented in an expanded overlay state can be dynamically updated in response to detected events or according to a predetermined periodic update schedule. The particular functionality and appearance of the expanded overlay state may depend on a variety of different factors, some of which may be user-configurable and others of which may be hard-coded or otherwise provisioned by default. For example, in certain embodiments the appearance and functionality of the expanded overlay state is different for the different types of campaign data snapshot cards illustrated in FIG. 4.

FIG. 13A illustrates a methodology 600 for invoking an expanded overlay state to access more detailed data and additional functionalities associated with a campaign data snapshot card in accordance with an embodiment of the present invention. The expanded overlay state can be accessed by clicking on, tapping or otherwise selecting 610 a selected campaign data snapshot card. The expanded overlay state can be accessed, for example, when the card is displayed in a card feed or a card board. Once selected, the expanded overlay state can be displayed 615 using the resources of an expanded overlay state generation module 150. In one embodiment, the expanded overlay state is displayed over the underlying card feed or card board from which the card was originally selected. The expanded overlay state can be displayed in a different position in other embodiments.

Figure 13B:
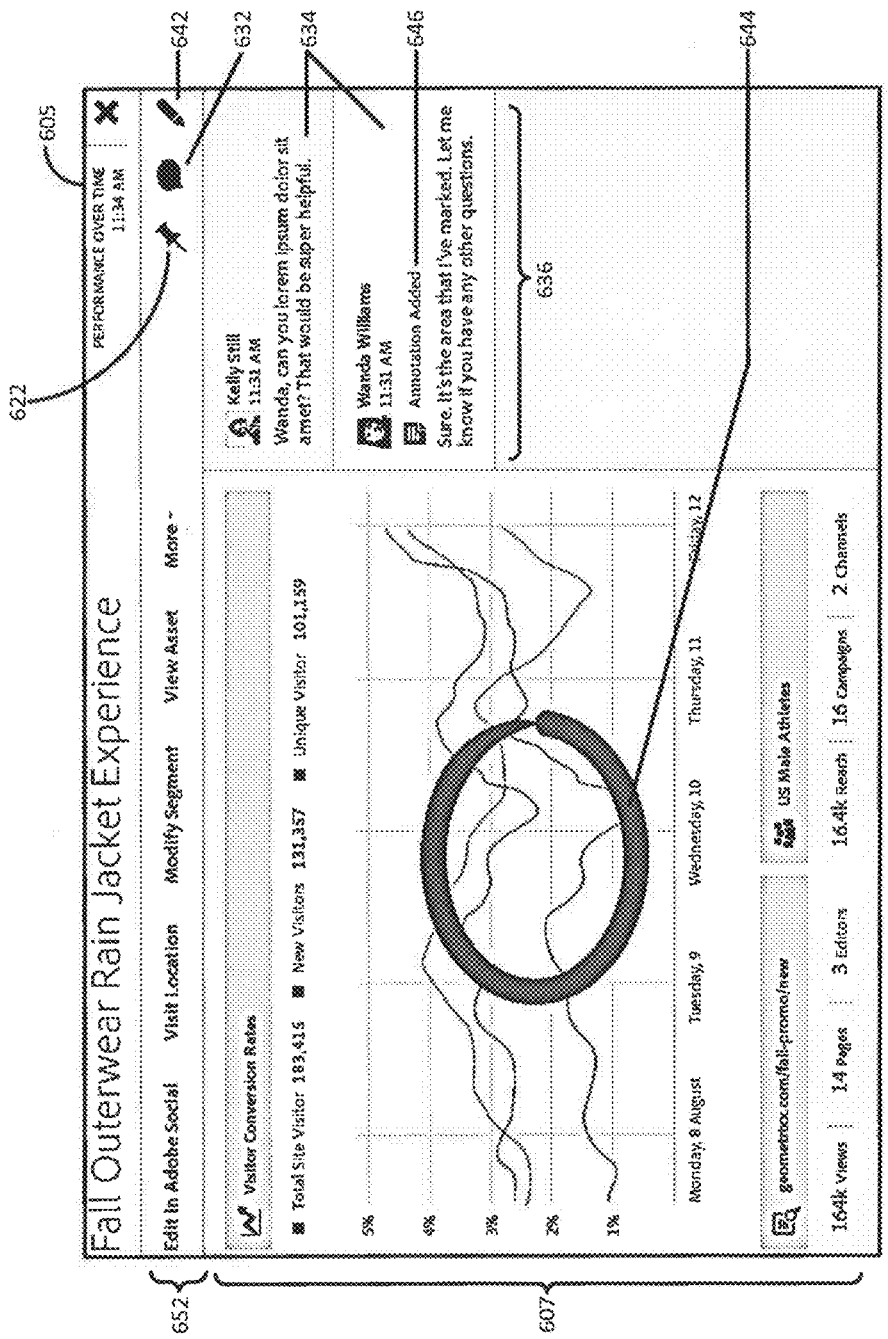
FIG. 13B is a screenshot illustrating an example expanded overlay state associated with an over-time report card, as configured in accordance with an embodiment of the present invention.

Because the expanded overlay state provides additional data and functionality relating to the underlying campaign data snapshot card, the particular content and appearance of a selected expanded overlay state depends on the type of card with which the expanded overlay state is associated. However, certain functionalities are common to the expanded overlay state associated with many different types of campaign data snapshot cards. Examples of such frequently commonly provided functionalities are provided in FIG. 13A, and are illustrated in the context of the example expanded overlay state illustrated in FIG. 13B. FIG. 13B is a screenshot illustrating an example expanded overlay state 605 associated with an over-time report card 241, as configured in accordance with an embodiment of the present invention. The expanded overlay state 605 provides, among other things, more detailed data 607 associated with the underlying campaign data snapshot card.

For example, the expanded overlay state 605 illustrated in FIG. 13B includes a pinning icon 622 which can be used to pin 620 the underlying campaign data snapshot card to a new or existing card board. Such functionality can be provided, for example, by the user board configuration module 142 described above with respect to FIG. 10B. Such an expanded overlay state 605 also includes a comment icon 632 which can be used to compose 630 one or more comments 634 to be posted and recorded in a comments interface 636 that forms part of the expanded overlay state 605. Such functionality can be provided, for example, by a messaging module 154 that stores and distributes such comments 634 to other campaign members who access the same expanded overlay state 605. Such comments 634 can be stored, for example, as part of the card metadata that is stored in published card data repository 192. The expanded overlay state 605 also includes an annotation icon 642 which can be used to sketch 640 an annotation 644 to be included and selectively displayed as part of the expanded overlay state 605. In such embodiments the expanded overlay state 605 also includes an annotation announcement 646 which can be used to indicate the presence of and view 645 a previously-sketched annotation 644. Such functionality can be provided, for example, by an annotation module 152 that stores and distributes such annotations 644 to other campaign members who access the same expanded overlay state 605. Such annotations 644 can be stored, for example, as part of the card metadata that is stored in the published card data repository 192. The expanded overlay state 605 also includes contextual action hyperlinks 652 which can be used to invoke 650 a contextual action that is associated with the underlying campaign data snapshot card, and that is provided by one of the campaign applications illustrated in FIGS. 1 and 2, as will be described in turn.

The annotation module 152 and messaging module 154 facilitate collaboration between campaign members with access to the expanded overlay state 605 by allowing the campaign members to exchange ideas and insights related to the more detailed data 607 provided in the expanded overlay state 605. Thus if, upon viewing the detailed data 607 a campaign member has an insight that he/she wishes to share with other campaign members who have access to the underlying card, he/she can compose a comment 634 and/or sketch an annotation 644 that will become part of the expanded overlay state 605. In such embodiments, the underlying card that is visible in other users' feed and/or board optionally includes an icon or other suitable notation indicating the presence of a new comment, and when other users view the corresponding expanded overlay state, the comment 634 will be visible. An annotation announcement 646 can be used to indicate the presence of an annotation 646; clicking, tapping or otherwise selecting the annotation announcement 646 can cause the annotation 644 to toggle between a displayed state and a hidden state.

As described above, in certain embodiments the expanded overlay state 605 includes contextual action hyperlinks 652 which can be used to invoke 650 a contextual action that is associated with the underlying campaign data snapshot card, and that is provided by a campaign application. For example, referring again to the expanded overlay state 605 illustrated in FIG. 13B, the contextual action hyperlinks 652 allow a campaign member to perform actions such as editing the underlying campaign tactic in one of the campaign applications, visiting a website where the campaign tactic is implemented, modifying a selected component of the campaign tactic, or viewing an asset being used in the campaign. Other functionality can be provided in other embodiments. Such contextual action hyperlinks 652 advantageously provide campaign members with direct access to act on insights gleaned from the expanded overlay state 605.

The functionalities provided by the contextual action hyperlinks 652 may vary depending on the type of campaign data snapshot card 200 that underlies the expanded overlay state 605. For instance, the tutorial cards 210 may include contextual action hyperlinks 652 that provide more detailed information regarding a particular aspect of the campaign manager platform 100. The application launch cards 220 may include contextual action hyperlinks 652 that provide the ability to access application support, the ability to share access to the selected application with another campaign member, and/or the ability to send comments to other campaign members. The asset testing cards 230 may include contextual action hyperlinks 652 that link to the targeted assets that are being tested, launch a simulation and/or modify the audience segments being tested. The report cards 240 may include contextual action hyperlinks 652 that provide the ability to launch the campaign application used to generate the data provided in the expanded overlay state 605, directly link to the website where the campaign tactic is implemented, identify data correlations, and view the various assets being used in the campaign. Asset cards 251 may include contextual action hyperlinks 652 that provide the ability to view assets, edit assets using digital image editing tools, and directly link to the website where the assets are in use. Tweet cards 252 may include contextual action hyperlinks 652 that provide the ability to access social networking reports, access cross-channel promotion resources, generate tweets and/or define campaign milestones.

Other types of campaign data snapshot cards may include other types of specialized contextual hyperlinks. For example, a snapshot card reporting on a detected anomaly may include a specialized hyperlink to a contribution analyzer that provides information on factors affecting the anomalous data and/or an anomaly threshold modification tool that adjusts how small an anomaly triggers other actions within the campaign. As another example, a campaign member may view an expanded overlay state of an asset testing card and glean an insight with respect to the specific definition of the audience being targeted. The campaign member can use contextual action hyperlinks to create a webpage targeting the audience, modify the audience definition and/or combine the audience with another similar audience. Likewise, a campaign member may view an expanded overlay state of an asset card representing a certain promotion and glean an insight with respect to how to improve that promotion. The campaign member can use contextual action hyperlinks to access a testing and targeting application allowing him/her to create multivariate testing relating to a variation of that promotion. It will be appreciated that an expanded overlay state may include hyperlinks to any of a wide range of suitable contextual actions, and that the present invention is not intended to be limited to any particular linked action or set of actions.

In certain embodiments the detailed data 607 and the contextual action hyperlinks 652 provided in an expanded overlay state are dependent on the role of the campaign member viewing the expanded overlay state. For example, an analyst viewing the expanded overlay state of an asset card representing a certain promotion may be presented with detailed data indicating how the promotion is working and contextual action hyperlinks allowing the analyst to conduct multivariate testing related to the promotion. However, a member of the campaign creative team viewing the expanded overlay state of that same asset card can be presented with detailed data regarding the assets used in the campaign and contextual action hyperlinks allowing the member of the creative team to edit such assets, modify the promotion or invoke an approval workflow. This allows the campaign manager platform 100 to provide the campaign members with functionality that is more closely correlated with the members' role in the overall campaign.

As described above, the expanded overlay state provides campaign members with the ability to easily collaborate and communicate with each other about the data generated by the campaign using textual comments and visual annotation tools. Because the underlying campaign data snapshot cards are shared through feeds and boards which can cross team boundaries within the campaign, this facilitates the process of sharing insights across such boundaries.

CONCLUSION

Numerous variations and configurations will be apparent in light of this disclosure. For instance, one example embodiment provides a method for publishing data generated in an online marketing campaign. The method comprises receiving, by a campaign manager platform, first campaign application data from a first digital marketing application and second campaign application data from a second digital marketing application. The method further comprises generating a report card based on the first campaign application data and a content card based on the second campaign application data. The method further comprises storing, in a published card data repository, metadata corresponding to the report card, the content card and an application launch card that includes a hyperlink that launches at least one of the first and second digital marketing applications. The method further comprises transmitting the report card, the content card and the application launch card to a selected campaign member. In some cases the first digital marketing application and the second digital marketing application are distinct applications in communication with the campaign manager platform. In some cases (a) the first digital marketing application is a digital analytics application and the second digital marketing application is a social marketing application; and (b) the first campaign application data comprise campaign status data and the second campaign application data comprise social networking data. In some cases the selected campaign member is not in communication with at least one of the first and second digital marketing applications. In some cases generating the report card further comprises determining whether the received first campaign application data correspond to metadata already saved in the published card data repository. In some cases a plurality of report cards are generated, each of the plurality of report cards including at least a portion of the received first campaign application data. In some cases the method further comprises storing, in a user data repository, information regarding the cards transmitted to the selected campaign member. In some cases the method further comprises storing, in a user data repository, information regarding the cards transmitted to the selected campaign member, wherein the user data repository includes login credential information authorizing the selected campaign member to access resources provided by at least one of the first and second digital marketing applications. In some cases the content card includes an online advertising asset distributed through a social networking channel. In some cases the method further comprising (a) receiving, by the campaign manager platform, test result data from a testing and targeting application; (b) generating a multivariate testing card that includes at least a portion of the received test result data; (c) storing, in the published card data repository, metadata corresponding to the multivariate testing card; and (d) transmitting the multivariate testing card to a second selected campaign member, wherein the second selected campaign member is in communication with at least one of the first and second digital marketing applications, but is not in communication with the testing and targeting application. In some cases the published card data repository includes metadata corresponding to a plurality of tutorial cards that do not contain data received from either of the first or second digital marketing applications. In some cases (a) the published card data repository includes metadata corresponding to a plurality of tutorial cards that do not contain data received from either of the first or second digital marketing applications; and (b) the plurality of tutorial cards are transmitted to the selected campaign member with the report card, the content card and the application launch card. In some cases the method further comprises applying a notification banner to at least one of the report card and the content card.

Another embodiment of the present invention provides a system for managing data generated in an online campaign. The system comprises a campaign manager platform configured to communicate with a plurality of campaign applications and a plurality of campaign members, wherein the plurality of campaign applications includes a digital analytics application that generates campaign status data and a social marketing application that generates social networking data. The system further comprises a publishing module configured to generate a report card based on the campaign status data and a content card based on the social networking data. The system further comprises a published card data repository that stores metadata associated with the report card, the content card and an application launch card that contains a hyperlink that launches a selected one of the plurality of campaign applications. The system further comprises a user communications module configured to transmit the report card, the content card and the application launch card to a selected campaign member. In some cases the selected campaign member is not in communication with either the digital analytics application or the social marketing application. In some cases the system further comprises a user data repository that stores user profile information relating to the selected campaign member. In some cases the campaign manager platform includes an application communications module configured to receive the campaign status data from the plurality of campaign applications and distribute the received campaign status data to the publishing module. In some cases the campaign manager includes an application communications module configured to determine whether the campaign status data corresponds to a previously published report card.

Another embodiment of the present invention provides a non-transient computer readable medium having instructions encoded thereon that, when executed by one or more processors causes a marketing data publication process to be carried out. The process comprises receiving, by a campaign manager platform, campaign status data from a digital analytics application. The process further comprises receiving, by the campaign manager platform, social networking data from a social marketing application. The process further comprises generating a report card that includes at least a portion of the received campaign status data. The process further comprises generating a content card that includes at least a portion of the received social networking data. The process further comprises storing, in a published card data repository, metadata corresponding to the report card, the content card and an application launch card that includes a hyperlink that launches at least one of the digital analytics application and the social marketing application. The process further comprises transmitting the report card, the content card and the application launch card to a selected campaign member. In some cases generating the content card further comprises determining whether the received social networking data corresponds to metadata already saved in the published card data repository. In some cases the marketing data publication process further comprises storing, in a user data repository, an index of the cards transmitted to the selected campaign member. In some cases the report card comprises a card selected from the group consisting of an over-time report card, a single value report cart, a ranked report card, a ranked pie report card, a trended ranked report card, and a tabular data report card.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for publishing data generated in an online marketing campaign, the method comprising:
providing a computing device that implements functionality associated with a campaign manager platform, wherein the computing device comprises a processor and a memory device, and wherein the memory device hosts a published card data repository;
storing, in the published card data repository,
(a) metadata corresponding to a plurality of campaign data cards that includes a report card, a first application launch card, and a second application launch card, and
(b) security credentials associated with a plurality of campaign members having access to a first digital marketing application,
wherein the first application launch card includes (i) a hyperlink that launches the first digital marketing application, and (ii) code that causes security credentials associated with a particular one of the campaign members to be retrieved from the published card data repository and transmitted to the first digital marketing application,
wherein the second application launch card includes (i) code that makes a first determination that the particular campaign member does not have access to a second digital marketing application, and (ii) code that, in response to making the first determination, causes creation of a new security credential to grant the particular campaign member access to the second digital marketing application, and
wherein the report card includes an initial value for a campaign performance metric generated by the first digital marketing application;
receiving, by the computing device, supplemental campaign status data generated by the first digital marketing application and campaign asset data generated by the second digital marketing application;
in response to receiving the supplemental campaign status data, making a second determination that a first portion of the supplemental campaign status data corresponds to updating the report card to indicate a new value for the campaign performance metric, and, in response to making the second determination, modifying a first portion of the metadata which corresponds to the report card;
further in response to making the second determination, comparing the initial and new values for the campaign performance metric, and, in response to determining that a differential between the initial and new values exceeds an anomaly detection threshold, applying a notification banner to the report card;
further in response to receiving the supplemental campaign status data, making a third determination that a second portion of the supplemental campaign status data does not correspond to any of the plurality of campaign data cards, and, in response to making the third determination, generating a new report card that includes at least a portion of the second portion of the supplemental campaign status data;
generating a content card based on the campaign asset data, wherein the content card displays a media asset used in the online marketing campaign, and wherein the second digital marketing application is capable of modifying the media asset;
storing, in the published card data repository, the modified first portion of metadata that corresponds to the report card, metadata corresponding to the new report card, metadata corresponding to the content card and the metadata corresponding to the first and second application launch cards; and
transmitting the report card, the new report card, the content card, the first application launch card, and the second application launch card to the particular campaign member.

2. The method of claim 1, wherein the first digital marketing application and the second digital marketing application are distinct applications in communication with the computing device.

3. The method of claim 1, wherein:
the first digital marketing application is a digital analytics application and
the second digital marketing application is a social marketing application.

4. The method of claim 1, wherein, in response to making the third determination, a plurality of new report cards are generated, each of the plurality of new report cards including at least a portion of the second portion of the supplemental campaign status data.

5. The method of claim 1, further comprising storing, in a user data repository hosted by the memory device, information regarding the campaign data cards transmitted to the particular campaign member.

6. The method of claim 1, further comprising storing, in a user data repository hosted by the computing device, profile information relating to the particular campaign member.

7. The method of claim 1, wherein the media asset is distributed through a social networking channel as part of the online marketing campaign.

8. The method of claim 1, further comprising:
receiving, by the computing device, test result data from a testing and targeting application;
generating a multivariate testing card that includes at least a portion of the received test result data;
storing, in the published card data repository, metadata corresponding to the multivariate testing card; and
transmitting the multivariate testing card to a second campaign member, wherein the second campaign member is in communication with at least one of the first and second digital marketing applications, but is not in communication with the testing and targeting application.

9. The method of claim 1, wherein the published card data repository includes metadata corresponding to a plurality of tutorial cards that contain neither the supplemental campaign status data generated by the first digital marketing application, nor the campaign asset data generated by the second digital marketing application.

10. The method of claim 1, wherein:
the published card data repository includes metadata corresponding to a plurality of tutorial cards that contain neither the supplemental campaign status data generated by the first digital marketing application, nor the campaign asset data generated by the second digital marketing application; and
the plurality of tutorial cards are transmitted to the particular campaign member with the report card, the new report card, the content card and the first and second application launch cards.

11. The method of claim 1, further comprising applying a second notification banner to at least one of the new report card and the content card.

12. A system for managing data generated in an online campaign, the system comprising:
a campaign manager platform configured to communicate with a plurality of campaign applications and a plurality of campaign members, wherein the plurality of campaign applications includes a digital analytics application that generates campaign status data and a social marketing application that generates social networking data;
a publishing module configured to generate a report card based on the campaign status data and a content card based on the social networking data, wherein the content card displays a media asset used in the online campaign, and wherein the social marketing application is capable of modifying the media asset;
a published card data repository that stores (a) metadata associated with the report card, the content card, a first application launch card, and a second application launch card, and (b) security credentials associated with a subset of the campaign members having access to the digital analytics application,
wherein the first application launch card contains (i) a hyperlink that launches the digital analytics application, and (ii) code that causes security credentials associated with a particular one of the campaign members to be retrieved from the published card data repository and transmitted to the digital analytics application,
wherein the second application launch card includes (i) code that makes a first determination that the particular campaign member does not have access to the social marketing application, and (ii) code that, in response to making the first determination, causes creation of a new security credential to grant the particular campaign member access to the social marketing application, and
wherein the report card includes an initial value for a campaign performance metric generated by the digital analytics application; and
a user communications module configured to transmit the report card, the content card, the first application launch card, and the second application launch card to the particular campaign member,
wherein the campaign manager platform is further configured to
receive supplemental campaign status data,
make a second determination that a first portion of the supplemental campaign status data corresponds to updating the report card to indicate a new value for the campaign performance metric, and, in response to making the second determination, modify a first portion of the metadata which corresponds to the report card,
further respond to making the second determination by comparing the initial and new values for the campaign performance metric and in response to determining that a differential between the initial and new values exceeds an anomaly detection threshold, add a notification banner to the report card, and
make a third determination that a second portion of the supplemental campaign status data does not correspond to any campaign data cards having metadata stored in the published card data repository, and in response to making the third determination, generate a new report card that includes at least a portion of the second portion of the supplemental campaign status data.

13. The campaign data management system of claim 12, further comprising a user data repository that stores user profile information relating to the particular campaign member.

14. The campaign data management system of claim 12, wherein the campaign manager platform includes an application communications module configured to receive the campaign status data from the digital analytics application and distribute the received campaign status data to the publishing module.

15. The campaign data management system of claim 12, wherein the campaign manager platform includes an application communications module configured to:
receive, from the particular campaign member, a comment associated with the report card; and
update, in the published card data repository, metadata corresponding to the report card, wherein the updated metadata includes the comment received from the particular campaign member.

16. A non-transient computer readable medium having instructions encoded thereon that, when executed by one or more processors, cause a marketing data publication process to be carried out, the process comprising:
storing, in a published card data repository, (a) metadata corresponding to a plurality of campaign data cards that includes a report card, a first application launch card, and a second application launch card, and (b) security credentials associated with a plurality of campaign members having access to a first digital analytics application,
wherein the first application launch card includes (i) a hyperlink that launches the first digital analytics application, and (ii) code that causes security credentials associated with a particular one of the campaign members to be retrieved from the published card data repository and transmitted to the first digital analytics application,
wherein the second application launch card includes (i) code that makes a first determination that the particular campaign member does not have access to a second digital analytics application, and (ii) code that, in response to making the first determination, causes creation of a new security credential to grant the particular campaign member access to the second digital analytics application, and
wherein the report card includes an initial value for a campaign performance metric generated by the first digital analytics application;
receiving, by a campaign manager platform, supplemental campaign status data from the first digital analytics application;
in response to receiving the supplemental campaign status data, making a second determination that a first portion of the supplemental campaign status data corresponds to updating the report card to indicate a new value for the campaign performance metric, and, in response to making the second determination, modifying a first portion of the metadata which corresponds to the report card;
further in response to making the second determination, comparing the initial and new values for the campaign performance metric, and, in response to determining that a differential between the initial and new values exceeds an anomaly detection threshold, adding a notification banner to the report card;
further in response to receiving the supplemental campaign status data, making a third determination that a second portion of the supplemental campaign status data does not correspond to any of the plurality of campaign data cards, and, in response to making the third determination, generating a new report card that includes at least a portion of the second portion of the supplemental campaign status data;
storing, in the published card data repository, second metadata that corresponds to the new report card;
transmitting the report card, the new report card, the first application launch card, and the second application launch card to the particular campaign member;
receiving, from the particular campaign member, a card identifier that identifies a particular one of the plurality of campaign data cards, and a comment associated with the particular campaign data card; and
updating, in the published card data repository, metadata corresponding to the particular campaign data card, wherein the updated metadata includes the comment received from the particular campaign member.

17. The non-transient computer readable medium of claim 16, wherein the marketing data publication process further comprises storing, in a user data repository, an index of campaign data cards transmitted to the particular campaign member.

18. The non-transient computer readable medium of claim 16, wherein the new report card comprises a card selected from a group consisting of an over-time report card, a single value report card, a ranked report card, a ranked pie report card, a trended ranked report card, and a tabular data report card.

19. The method of claim 1, further comprising:
receiving, from the particular campaign member, a card identifier that identifies a particular one of the plurality of campaign data cards, and a comment associated with the particular campaign data card; and
updating, in the published card data repository, metadata corresponding to the particular campaign data card, wherein the updated metadata includes the comment received from the particular campaign member.

* * * * *

UNITED STATES PATENT AND TRADEMARK OFFICE
CERTIFICATE OF CORRECTION

PATENT NO.         : 10,360,579 B2
APPLICATION NO.    : 13/784425
DATED              : July 23, 2019
INVENTOR(S)        : Christopher Znerold, Paul Marcus A. Dennert and Daniel Walsh Page 1 of 1

It is certified that error appears in the above-identified patent and that said Letters Patent is hereby corrected as shown below:

In the Claims

Column 31, Line 17, Claim 5, please replace "regarding the campaign" with -- regarding campaign --.

Signed and Sealed this
Third Day of September, 2019

Andrei Iancu
*Director of the United States Patent and Trademark Office*